United States Patent [19]
Weaver, Jr. et al.

[11] Patent Number: 5,828,661
[45] Date of Patent: Oct. 27, 1998

[54] METHOD AND APPARATUS FOR PROVIDING A CONE OF SILENCE IN A CELLULAR COMMUNICATION SYSTEM

[75] Inventors: Lindsay A. Weaver, Jr., Boulder, Colo.; Katherine W. White, San Diego, Calif.

[73] Assignee: Qualcomm Incorporated, San Diego, Calif.

[21] Appl. No.: 651,368

[22] Filed: May 22, 1996

[51] Int. Cl.[6] .................................................. H04J 3/16
[52] U.S. Cl. ............................................ 370/331; 370/332
[58] Field of Search .................................... 370/200, 310, 370/311, 314, 320, 321, 346, 347, 348, 350, 441, 252, 241, 324, 329, 331, 332–337, 341–344, 500, 501, 503, 514, 515, 444, 442, 206; 455/54.1, 69, 33.1, 73, 422, 436, 450, 11.1, 13.1, 37.1, 38.1, 509, 502, 517, 524; 375/200, 206

[56] References Cited

U.S. PATENT DOCUMENTS

| | | | |
|---|---|---|---|
| 4,901,307 | 2/1990 | Gilhousen et al. | 370/18 |
| 5,101,501 | 3/1992 | Gilhousen et al. | 455/33 |
| 5,109,390 | 4/1992 | Gilhousen et al. | 375/1 |
| 5,164,958 | 11/1992 | Omura | 375/1 |
| 5,184,347 | 2/1993 | Farwell et al. | 370/94.1 |
| 5,235,615 | 8/1993 | Omura | 375/1 |
| 5,267,261 | 11/1993 | Blakeney, II et al. | 375/1 |
| 5,267,262 | 11/1993 | Wheatley, III | 375/1 |
| 5,278,892 | 1/1994 | Bolliger et al. | 379/60 |
| 5,295,153 | 3/1994 | Gudmundson | 375/1 |
| 5,305,308 | 4/1994 | English et al. | 370/32.1 |
| 5,313,489 | 5/1994 | Menich et al. | 375/1 |
| 5,341,397 | 8/1994 | Gudmundson | 375/1 |
| 5,345,467 | 9/1994 | Lomp et al. | 375/1 |
| 5,367,533 | 11/1994 | Schilling | 375/1 |
| 5,412,658 | 5/1995 | Arnold et al. | 370/69.1 |
| 5,416,797 | 5/1995 | Gilhousen et al. | 375/705 |
| 5,438,565 | 8/1995 | Hemmady et al. | 370/60 |
| 5,448,754 | 9/1995 | Ho et al. | 455/34.1 |
| 5,485,486 | 1/1996 | Gihousen et al. | 375/200 |

FOREIGN PATENT DOCUMENTS

| | | | |
|---|---|---|---|
| 9603845 | 2/1996 | WIPO | H04Q 7/38 |
| 9612380 | 4/1996 | WIPO | H04Q 7/38 |

OTHER PUBLICATIONS

Alejandro R. Holcman et al., "CDMA Intersystem Operations", IEEE Jun. 8, 1994, pp. 590–594.

Klein S. Gilhousen et al, "Increased Capacity Using CDMA for Mobile Satellite Communication", *IEEE Journal On Selected Areas In Communications*, vol. 8, No. 4, May 1990, pp. 503–514.

TIA Document entitled "CDMA Intersystem Operations" by Alejandro Holcman et al. of QUALCOMM Incorporated, Presented at IEEE Conference on Vehicular Technology Committee in Stockholm, Sweden on Jun. 8, 1994, 5 pages.

(List continued on next page.)

*Primary Examiner*—Dang Ton
*Attorney, Agent, or Firm*—Russell B. Miller; Bruce W. Greenhaus

[57] ABSTRACT

In a communications network, a remote unit communicates with another user via at least one base station. The network has a plurality of base stations controlled by a mobile switching center. Each base station of the plurality of base stations transmits an identifying pilot signal. To defining an area in which communication between a set of the base stations and the remote unit is forbidden, an auxiliary antenna transmits a silent region identifying pilot signal. The remote unit measures a signal strength of a set of identifying pilot signals corresponding to a neighbor set of base stations and measures a signal strength of the silent region identifying pilot signal. The remote unit sends a pilot strength measurement report to the mobile switching center via a first base station with which the remote unit has established communication. A handoff of the established communication between the remote unit and the first base station is initiated if the pilot strength measurement report comprises an entry corresponding to the silent region identifying pilot signal.

23 Claims, 10 Drawing Sheets

OTHER PUBLICATIONS

TIA TR45.2 Intersystems Operations Presentation entitled "The Wideband Spread Spectrum Standard Under Development in TR45.5" by Edward G. Tiedemann, Jr. of QUALCOMM Incorporated, presented in Atlanta, Georgia, Nov. 16–20, 1992, 9 pages.

TIA Document entitled "Intersystem, Operation with The Proposed Wideband Spread Spectrum Dual–Mode Mobile Station–Base Station Compatibility Standard" by Gadi Karmi et al. of QUALCOMM Incorporated, presented May 18, 1992 in Atlanta, Georgia, pp. 1–37.

TIA Document entitled "Alternative Methods For Inter–Channel Handoff" by Charles E. Wheatley, III of QUALCOMM Incorporated, presented on Nov. 10–20, 1992 in Atlanta, Georgia, pp. 1–3.

TIA Document entitled "Proposed Draft Liaison Statement to TR45.2" by Edward G. Tiedemann, Jr. of QUALCOMM Incorporated presented Dec. 3–11, 1992 in Phoenix, Arizona, pp. 1–32.

TIA Document entitled "Intersystem Issues For Support Of The Wideband Spread–Spectrum Digital Standard" by Gadi Karmi of QUALCOMM Incorporated presented Oct. 6, 1992 in Boston, Massachusetts, pp. 1–7.

TIA/EIA Telecommunications Systems Bulletin entitled "Cellular Radiotelecommunications Intersystem Operations: Authentication, Signaling Message Encryption and Voice Privacy", May 1993, 9 pages.

EIA/TIA interim Standard entitled "Cellular Radiotelecommunications Intersystem Operations: Intersystem Handoff", Dec. 1991, 18 pages.

TIA/EIA Telecommunications Systems Bulletin entitled "IS–41–B Mobile Border System Problems", Apr. 1994, 26 pages.

TIA/EIA Telecommunications Systems Bulletin entitled"IS–41–B Support for Dual Mode Wideband Spread Spectrum Mobile Stations", Jan. 1994, 14 pages.

TIA Document entitled "Soft Handoff Frame Format" by Edward G. Tiedemann, Jr. of QUALCOMM Incorporated presented Dec. 11–14, 1995 in Dallas, Texas, pp. 1–7.

METHOD AND APPARATUS FOR PROVIDING A CONE OF SILENCE IN A CELLULAR COMMUNICATION SYSTEM

BACKGROUND OF THE INVENTION

I. Field of the Invention

The present invention relates generally to cellular communications systems in which are disposed multiple base stations. More particularly, the present invention relates to a novel and improved technique for handing off communication between base stations of different cellular systems.

II. Description of the Related Art

The use of code division multiple access (CDMA) modulation techniques is but one of several techniques for facilitating communications in which a large number of system users are present. Although other techniques such as time division multiple access (TDMA), and frequency division multiple access (FDMA) are known, CDMA has significant advantages over these other modulation techniques. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention, the disclosure of which is incorporated herein by reference.

In the just mentioned patent, a multiple access technique is disclosed in which a large number of mobile telephone system users, each having a transceiver (also known as a remote unit), communicate through satellite repeaters or terrestrial base stations (also known as base stations or cell-sites) using CDMA spread spectrum communication signals. In using CDMA communications, the frequency spectrum can be reused multiple times. The use of CDMA techniques results in a much higher spectral efficiency than can be achieved using other multiple access techniques thus permitting an increase in system user capacity.

The conventional FM cellular telephone systems used within the United States is commonly called the Advanced Mobile Phone Service (AMPS), and is detailed in Electronic Industry Association standard EIA/TIA-553 "Mobile Station—Land Station Compatibility Specification". In such a conventional FM cellular telephone system, the available frequency band is divided into channels typically 30 Kilo Hertz (kHz) in bandwidth. The system service area is divided geographically into base station coverage areas which may vary in size. The available frequency channels are divided into sets. The frequency sets are assigned to the coverage areas in such a way as to minimize the possibility of co-channel interference. For example, consider a system in which there are seven frequency sets and the coverage areas are equally sized hexagons. The frequency set used in one coverage area is not used in the six nearest neighboring coverage areas.

In conventional cellular systems, a handoff scheme is used to allow a communication connection to continue when a remote unit crosses the boundary between coverage areas of two different base stations. In the AMPS system, the handoff from one base station to another is initiated when the receiver in the active base station handling the call notices that the received signal strength from the remote unit has fallen below a predetermined threshold value. A low signal strength indication implies that the remote unit must be near the coverage area boundary of the base station. When the signal level falls below the predetermined threshold value, the active base station asks the system controller to determine whether a neighboring base station receives the remote unit signal with better signal strength than the current base station.

The system controller in response to the active base station inquiry sends messages to the neighboring base stations with a handoff request. Each of the base stations neighboring the active base station employs a special scanning receiver which looks for the signal from the remote unit on the channel at which it is operating. Should one of the neighboring base stations report an adequate signal level to the system controller, a handoff is attempted to that neighboring base station which is now labeled the target base station. Handoff is then initiated by selecting an idle channel from the channel set used in the target base station. A control message is sent to the remote unit commanding it to switch from the current channel to the new channel supported by the target base station. At the same time, the system controller switches the call connection from the active base station to the target base station. This process is referred to as hard handoff. The term hard is used to characterize the 'break-before-make' characteristic of the handoff.

In the conventional system a call connection is dropped (i.e. discontinued) if the handoff to the target base station is unsuccessful. There are many reasons that a hard handoff failure may occur. Handoff can fail if there is no idle channel available in the target base station. Handoff can also fail if one of the neighboring base stations reports receiving a signal from the remote unit, when in fact the base station actually is receiving a different remote unit signal using the same channel to communicate with a distant base station. This reporting error results in the transfer of the call connection to a wrong base station, typically one in which signal strength from the actual remote unit is insufficient to maintain communications. Furthermore should the remote unit fail to receive the command to switch channels, the handoff fails. Actual operating experience indicates that handoff failures occur frequently which significantly lowers the reliability of the system.

Another common problem in the conventional AMPS telephone system occurs when the remote unit remains for an extended period of time near the border between two coverage areas. In this situation the signal level tends to fluctuate with respect to each base station as the remote unit changes position or as other reflective or attenuative objects within the coverage area change position. The signal level fluctuations can result in a "ping-ponging" situation in which repeated requests are made to handoff the call back and forth between the two base stations. Such additional unnecessary handoffs increase the probability that the call is inadvertently discontinued. In addition, repeated handoffs even if successful can adversely effect signal quality.

In U.S. Pat. No. 5,101,501, entitled "METHOD AND SYSTEM FOR PROVIDING A SOFT HANDOFF IN COMMUNICATIONS IN A CDMA CELLULAR TELEPHONE SYSTEM", issued Mar. 31, 1992, which is assigned to the assignee of the present invention, a method and system are disclosed for providing communication with the remote unit through more than one base station during the handoff of a CDMA call. Using this type of handoff communication within the cellular system is uninterrupted by the handoff from the active base station to the target base station. This type of handoff may be considered as a "soft" handoff in that concurrent communications is established with the target base station which becomes a second active base station before communication with the first active base station is terminated.

An improved soft handoff technique is disclosed within U.S. Pat. No. 5,267,261, entitled "MOBILE STATION ASSISTED SOFT HANDOFF IN A CDMA CELLULAR COMMUNICATIONS SYSTEM", issued Nov. 30, 1993, hereinafter referred to as the '261 patent, which is also assigned to the assignee of the present invention. In the system of the '261 patent, the soft handoff process is controlled based on by measurements at the remote unit of the strength of "pilot" signals transmitted by each base station within the system. These pilot strength measurements assist the soft handoff process by facilitating identification of viable base station handoff candidates.

More specifically, in the system of the '261 patent the remote unit monitors the signal strength of pilot signals from neighboring base stations. The coverage area of the neighboring base stations need not actually abut the coverage area of the base station with which active communication is established. When the measured signal strength of the pilot signal from one of the neighboring base stations exceeds a given threshold, the remote unit sends a signal strength message to a system controller via the active base station. The system controller commands a target base station to establish communication with the remote unit and commands the remote unit via the active base station to establish contemporaneous communication through the target base station while maintaining communication with the active base station. This process can continue for additional base stations.

When the remote unit detects that the signal strength of a pilot corresponding to one of the base stations through which the remote unit is communicating has fallen below a predetermined level, the remote unit reports the measured signal strength of the corresponding base station to the system controller via the active base stations. The system controller sends a command message to the identified base station and to the remote unit to terminate communication through the identified base station while maintaining communications through the other active base station or base stations.

Although the foregoing techniques are well-suited for call transfers between base stations in the same cellular system which are controlled by the same system controller, a more difficult situation is presented by movement of the remote unit into a coverage area serviced by a base station from another cellular system. One complicating factor in such "intersystem" handoffs is that each system is controlled by a different system controller and typically there is no direct link between the base stations of the first system and the system controller of the second system and vice versa. The two systems are thereby precluded from performing simultaneous remote unit communication through more than one base station during the handoff process. Even when the existence of an intersystem link between the two systems is available to facilitate intersystem soft handoff, often dissimilar characteristics of the two systems further complicate the soft handoff process.

When resources are not available to conduct intersystem soft handoffs, the execution of a "hard" handoff of a call connection from one system to another becomes critical if uninterrupted service is to be maintained. The intersystem handoff must be executed at a time and location likely to result in successful transfer of the call connection between systems. It follows that the handoff should be attempted only when, for example:

(i) an idle channel is available in the target base station,
(ii) the remote unit is within range of the target base station and the active base station, and
(iii) the remote unit is in a position at which it is assured of receiving the command to switch channels.

Ideally, each such intersystem hard handoff should be conducted in a manner which minimizes the potential for "ping-ponging" handoff requests between the base stations of different systems.

These and other shortcomings of existing intersystem handoff techniques impair the quality of cellular communications, and may be expected to further degrade performance as competing cellular systems continue to proliferate. Accordingly, there is a resulting need for an intersystem handoff technique capable of reliably executing the handoff of a call between the base stations of different systems.

SUMMARY OF THE INVENTION

The present invention is a method and apparatus for identifying a region within a communications network. Spacially, a cone of silence is constructed around a point to point microwave link. The cone of silence is a pilot signal that acts as a reference signal to the remote units that detect it. When a remote unit reports detection of a pilot signal corresponding to the cone of silence, the system controller knows the pilot signal is a cone of silence indication rather than a viable candidate pilot signal. The system controller uses receipt of the cone of silence pilot signal as a stimulus to initiate a hard handoff. Typically the handoff performed is a intrasystem CDMA to CDMA different frequency handoff although other types of handoff may be performed.

The cone of silence pilot signal is not associated with any base station in particular. Typically, the cone of silence pilot signal is generated by a pilot beacon unit collocated with a directional microwave antenna providing the point to point microwave link. There are two different cone of silence topologies which can be used. In the first topology, narrow transmission bands guard both sides of a point to point microwave link. In the second topology, the cone of silence pilot signal and the point to point microwave link actually overlay the same coverage area.

BRIEF DESCRIPTION OF THE DRAWINGS

The features, objects, and advantages of the present invention will become more apparent from the detailed description set forth below when taken in conjunction with the drawings wherein.

DESCRIPTION OF THE PREFERRED EMBODIMENT

Figure 1:
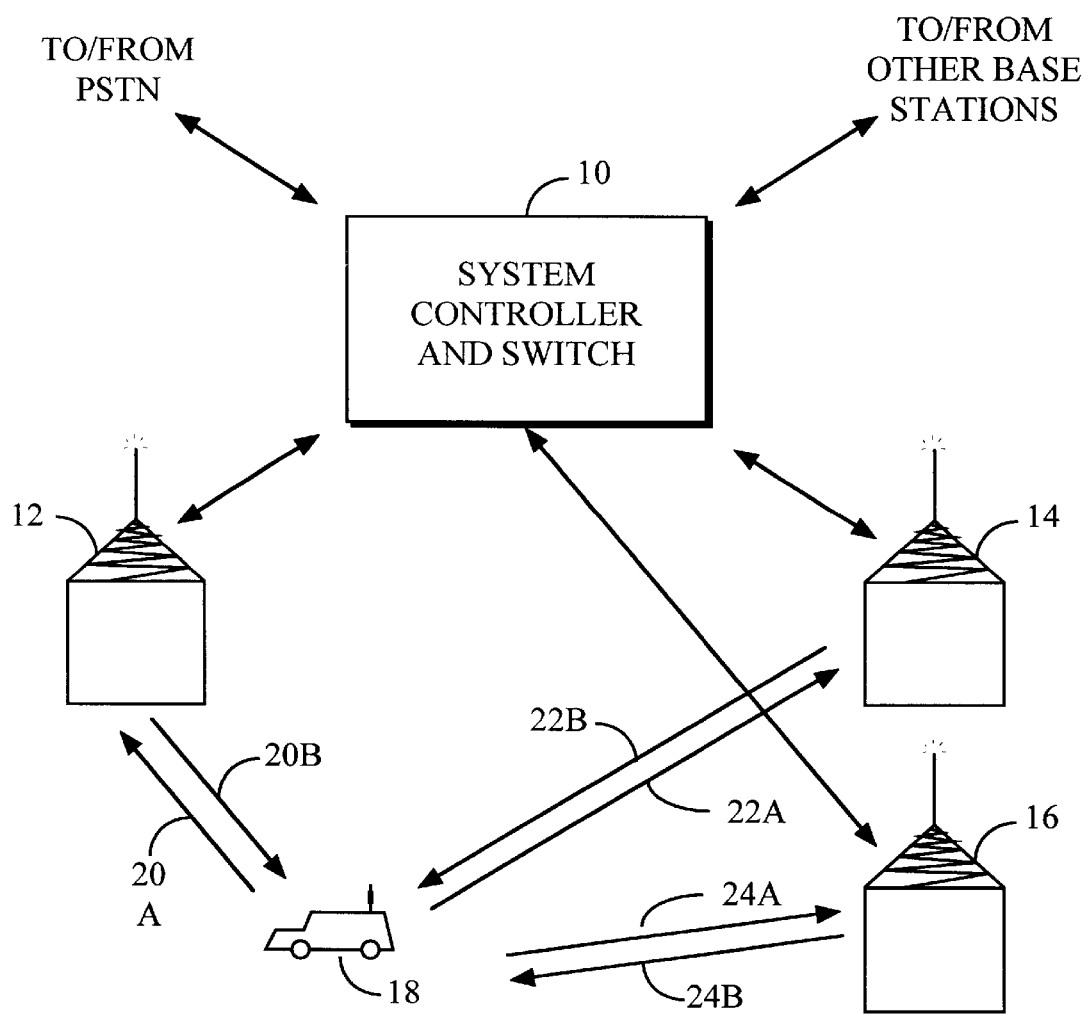
FIG. 1 provides an exemplary illustration of a cellular WLL, PCS or wireless PBX system.

An exemplary illustration of a cellular telephone system, a wireless private branch exchange (PBX) system, a wireless local loop (WLL), personal communication system (PCS) system or other analogous wireless communication system is provided in FIG. 1. In an alternative embodiment, the base stations of FIG. 1 may be satellite based. The system illustrated in FIG. 1 may use various multiple access modulation techniques for facilitating communications between a large number of remote units, and a plurality of the base stations. A number of multiple access communication system techniques, such as time division multiple access (TDMA), frequency division multiple access (FDMA), code division multiple access (CDMA), and amplitude modulation (AM) schemes such as amplitude companded single sideband are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention, which is herein incorporated by reference. Many of the ideas described herein can be used with a variety of communication techniques even through the preferred embodiments disclosed herein are described with reference to a CDMA system.

In the above-referenced U.S. Pat. No. 4,901,307, a multiple access technique is disclosed where a large number of mobile telephone system users each having a transceiver communicate through satellite repeaters or terrestrial base stations using CDMA spread spectrum communication signals. In using CDMA communications, the same frequency spectrum can be reused multiple times to communicate a plurality of distinct communication signals. The use of CDMA results in a much higher spectral efficiency than can be achieved using other multiple access techniques thus permitting an increase in system user capacity.

In the typical CDMA system, each base station transmits a unique pilot signal. In the preferred embodiment, the pilot signal is an unmodulated, direct sequence, spread spectrum signal transmitted continuously by each base station using a common pseudorandom noise (PN) spreading code. Each base station or base station sector transmits the common pilot sequence offset in time from the other base stations. The remote units can identify a base station based on the code phase offset of the pilot signal that it receives from the base station. The pilot signal also provides a phase reference for coherent demodulation and the basis of the signal strength measurements used in handoff determination.

Referring again to FIG. 1, system controller and switch 10, also referred to as a mobile switching center (MSC), typically includes interface and processing circuitry for providing system control to the base stations. Controller 10 also controls the routing of telephone calls from the public switched telephone network (PSTN) to the appropriate base station for transmission to the appropriate remote unit. Controller 10 also controls the routing of calls from the remote units, via at least one base station to the PSTN. Controller 10 may direct calls between remote units via the appropriate base stations.

A typical wireless communication system contains some base stations having multiple sectors. A multi-sectored base station comprises multiple independent transmit and receive antennas as well as some independent processing circuitry. The present invention applies equally to each sector of a sectorized base station and to single sectored independent base stations. The term base station can be assumed to refer to either a sector of a base station or a single sectored base station.

Controller 10 may be coupled to the base stations by various means such as dedicated telephone lines, optical fiber links or by microwave communication links. FIG. 1 illustrates exemplary base stations 12,14,16 and exemplary remote unit 18. Remote unit 18 may be a vehicle based telephone, a hand-held portable unit, a PCS unit, or a fixed location wireless local loop unit or any other conforming voice or data communication device. Arrows 20A–20B illustrate the possible communication link between base station 12 and remote unit 18. Arrows 22A–22B illustrate the possible communication link between base station 14 and remote unit 18. Similarly, arrows 24A–24B illustrate the possible communication link between base station 16 and remote unit 18.

The base station locations are designed to provide service to remote units located within their coverage areas. When the remote unit is idle, i.e. no call is in progress, the remote unit constantly monitors the pilot signal transmissions from each nearby base station. As illustrated in FIG. 1 the pilot signals are transmitted to remote unit 18 by base stations 12,14, and 16 upon communication links 20B,22B,and 24B, respectively. Generally speaking, the term forward link refers to the connection from the base station to the remote unit. Generally speaking, the term reverse link refers to the connection from the remote unit to the base station.

In the example illustrated in FIG. 1, remote unit 18 may be considered to be in the coverage area of base station 16. As such remote unit 18 tends to receive the pilot signal from base station 16 at a higher level than any other pilot signal it monitors. When remote unit 18 initiates a traffic channel communication (i.e. a telephone call), a control message is transmitted to base station 16. Base station 16, upon receiving the call request message, signals controller 10 and transfers the called telephone number. Controller 10 then connects the call through the PSTN to the intended recipient.

Should a call be initiated from the PSTN, controller 10 transmits the call information to a set of base stations located in proximity to the location at which the remote unit most recently registered its presence. The base stations in return broadcast a paging message. When the intended remote unit receives its page message, it responds with a control message that is transmitted to the nearest base station. The control message notifies controller 10 that this particular base station is in communication with the remote unit. Controller 10 initially routes the call through this base station to the remote unit.

Should remote unit 18 move out of the coverage area of the initial base station for example, base station 16, communication is transferred to another base station. The process of transferring the communication to another base station is referred to as handoff. In the preferred embodiment, the remote unit initiates and assists the handoff process.

In accordance with the "Mobile Station-Base Station Compatibility Standard for Dual-Mode Wideband Spread Spectrum Cellular System," TIA/EIA/IS-95, generally referred to simply as IS-95, a "remote unit-assisted" handoff may be initiated by the remote unit itself. The remote unit is equipped with a search receiver which is used to scan for the pilot signal transmission of neighboring base stations in addition to performing other functions. If a pilot signal of one of the neighboring base stations, for example base station 12, is found to be stronger than a given threshold, remote unit 18 transmits a message to the current base station, base station 16. The information is communicated via base station 16 to controller 10. Controller 10 upon receiving this information may initiate a connection between remote unit 18 and base station 12. Controller 10 requests that base station 12 assign resources to the call. In the preferred embodiment, base station 12 assigns a channel element to process the call and reports such assignment back to controller 10. Controller 10 informs remote unit 18 through base station 16 to search for a signal from base station 12 and informs base station 12 of the remote unit traffic channel parameters. Remote unit 18 communicates through both base stations 12 and 16. During this process the remote unit continues to identify and measure the signal strength of the pilot signals which it receives. In this way, remote unit assisted handoff is achieved.

The foregoing process may also be considered to be a "soft" handoff in that the remote unit simultaneously communicates through more than one base station. During a soft handoff, the MSC can combine or choose between the signals received from each base station with which the remote unit is in communication. The MSC relays signals from the PSTN to each base station with which the remote unit is in communication. The remote unit combines the signals it receives from each base station to produce an aggregate result.

Upon review of the process of soft handoff, it is clear that the MSC provides the centralized control of the process. Remote unit-assisted handoffs tend to be more complex if the remote unit happens to be located within the coverage area of two or more base stations which are not within the same cellular system, i.e., which are not controlled by the same MSC.

Figure 2:
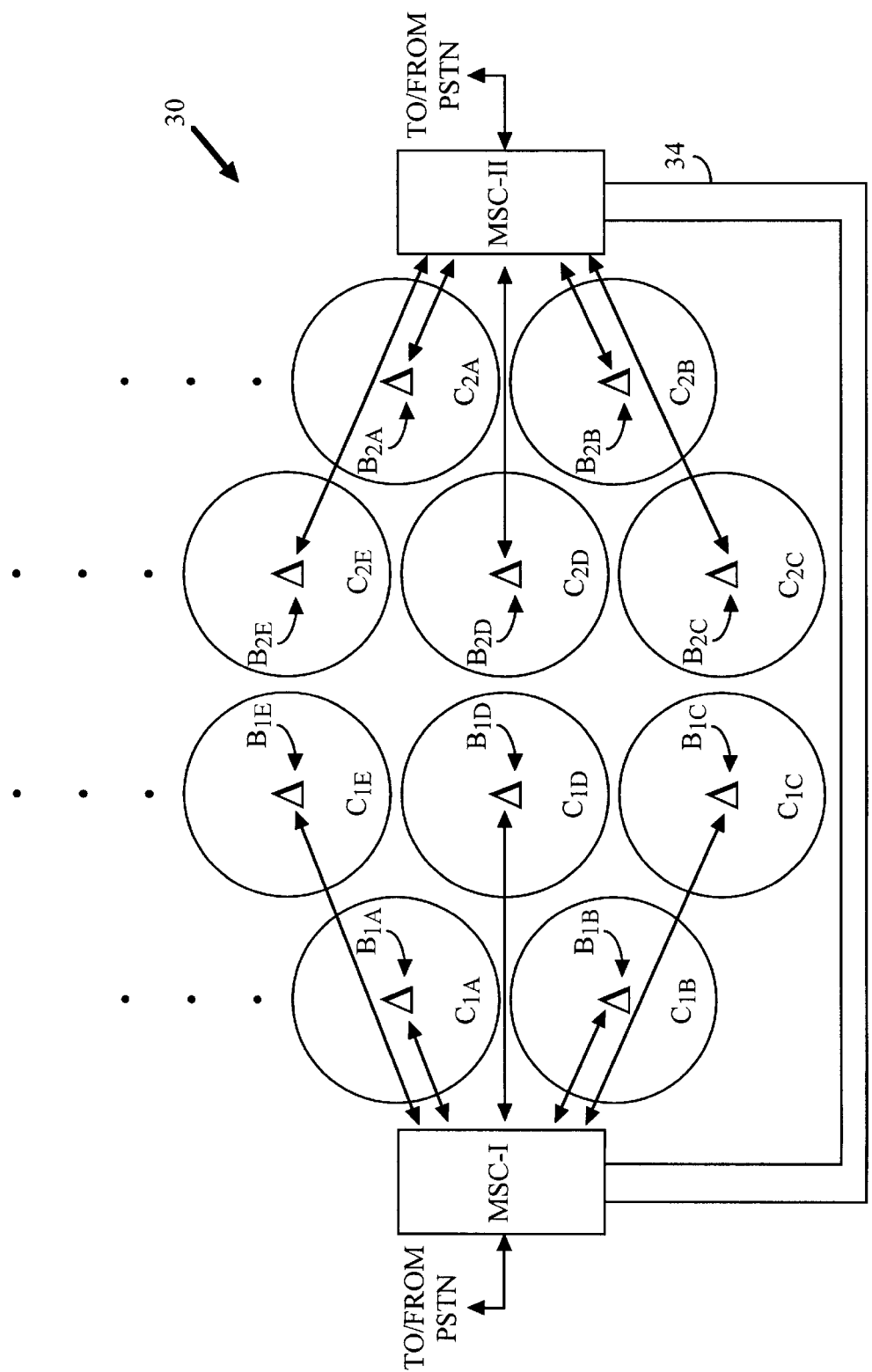
FIG. 2 shows a cellular communications network comprised of a first and second cellular system respectively controlled by first (MSC-I) and second (MSC-II) mobile switching centers.

FIG. 2 shows a cellular communications network 30 comprising a first and second cellular systems under the control of first and second mobile switching centers, MSC-I and MSC-II, respectively. MSC-I and MSC-II are respectively coupled to the base stations of the first and second cellular systems by various means such as dedicated telephone lines, optical fiber links or by microwave communication links. FIG. 2 shows five such exemplary base stations $B_{1A}$–$B_{1E}$ servicing coverage areas $C_{1A}$–$C_{1E}$ of the first system, and five base stations $B_{2A}$–$B_{2E}$ servicing the coverage areas $C_{2A}$–$C_{2E}$ of the second cellular system.

For convenience of illustration, the coverage areas $C_{1A}$–$C_{1E}$ and $C_{2A}$–$C_{2E}$ of FIG. 2, and the coverage areas shown in FIG. 3 subsequently introduced herein, are shown as being circular or hexagonal and are highly idealized. In the actual communication environment, base station coverage areas may vary in size and in shape. Base station coverage areas may tend to overlap with coverage area boundaries defining coverage area shapes different from the ideal circular or hexagonal shape. Furthermore, base stations may also be sectored, such as into three sectors, as is well known in the art.

In what follows coverage areas $C_{1C}$–$C_{1E}$ and $C_{2C}$–$C_{2E}$ may be referred to as border or transition coverage areas because these coverage areas are proximate the boundary between the first and second cellular systems. The remainder of the coverage areas within each system are referred to as internal or interior the coverage area.

A quick examination of FIG. 2 reveals that MSC-II does not have direct access to communicate with base stations $B_{1A}$–$B_{1E}$ and MSC-I does not have direct access to communicate with base stations $B_{2A}$–$B_{2E}$. As shown in FIG. 2 MSC-I and MSC-II can communicate with one another. For example, EIA/TIA/IS-41 entitled "Cellular Radio Telecommunication Intersystem Operations," and subsequent revision thereof, define a standard for communication between switches of different operating regions as shown by intersystem data link 34 in FIG. 2. To provide soft handoff between one of base stations $B_{1C}$–$B_{1E}$ and one of base stations $B_{2C}$–$B_{2E}$, a large volume of call signal and power control information has to pass between MSC-I and MSC-II. The protracted nature of the switch-to-switch connection and the large volume of call signal and power control information may cause undue delay and may sacrifice undue resources. Another difficulty in providing soft handoff is that the architecture of the system controlled by MSC-I and the system controlled by MSC-II can be vastly different. Also the method of power control used by two systems might be quite different. Therefore the present invention relates to providing a mechanism of hard handoff between two systems to avoid the complications and expense of intersystem soft handoff.

A mechanism for hard handoff can be used in several situations. For example, the system controlled by MSC-II may not use CDMA to communicate signals but instead may use FM, TDMA, or another method. In such a case, hard handoff is required even if a mechanism for intersystem soft handoff is provided in the system controlled by MSC-I because soft handoff is only possible if both systems operate using CDMA. Accordingly this invention could be used to handoff remote units between two systems employing different air interfaces. The second system may need to be modified to transmit a pilot signal or other CDMA beacon to aid in the initiation of the hard handoff process. A system employing a pilot beacon is detailed in U.S. Pat. No. 5,594,718 entitled "METHOD AND APPARATUS FOR MOBILE UNIT ASSISTED CDMA TO ALTERNATIVE SYSTEM HARD HANDOFF" issued Jan. 14, 1997. An alternate system is detailed in co-pending U.S. patent application Ser. No. 08/522,469 entitled "SAME FREQUENCY, TIME-DIVISION-DUPLEX REPEATER" filed Aug. 31, 1995 both of which are assigned to the assignee of the present invention. A system using a pilot beacon unit is detailed in copending U.S. Pat. No. 5,697,055 entitled "METHOD AND APPARATUS FOR HANDOFF BETWEEN DIFFERENT CELLULAR COMMUNICATIONS SYSTEMS" issued Dec. 9, 1997 and assigned to the assignee of the present invention.

Another situation in which a hard handoff can be useful is the case where a remote unit must change the frequency at which it operates. For example, within the PCS band, point to point microwave links may operate in co-existence with the CDMA communication system. In FIG. 3, point to point microwave link 140 is shown between directional microwave antenna 130 and directional microwave antenna 135. Base stations 40, 100, and 110 may need to avoid the use of the frequency band used by point to point microwave link 140 and thereby avoid interference between the two systems. Because directional microwave antenna 130 and directional microwave antenna 135 are highly directional, point to point microwave link 140 has a very narrow field. As such, the other base stations of the system, such as base stations 115,120, and sectors 50, and 70, may operate without interference with point to point microwave link 140. Thus, remote unit 125 may be operating on a CDMA channel in the same frequency band as point to point microwave link 140. If remote unit 125 moves toward base station 110 which does not support communication on the frequency that remote unit 125 is currently operating on, it is not possible to complete a soft handoff from base station 115 to base station 110. Instead base station 115 may order remote unit 125 to perform a hard handoff to another frequency band which is supported by base station 110.

Another situation in which a hard handoff may be useful is the case where a remote unit must change the frequency at which it operates to more evenly distribute load. For example, within the PCS band, the CDMA communicating with traffic channel signals in a plurality of frequency bands such as frequency band $f_1$ and frequency band $f_2$. If frequency band $f_2$ is more heavily loaded with active communication signals than frequency band $f_1$, it may be advantageous to off load some of the active communication signal from frequency band $f_2$ to frequency band $f_1$. To effect load sharing, one or more remote units operating in frequency band $f_2$ are commanded to begin operating in frequency band $f_2$ by performing an intrasystem hard handoff.

The most reliable way to perform the hard handoff may be to have base station 115 perform a hard handoff to an alternative frequency within itself. Thus at some point when remote unit 125 is receiving rather large and reliable signals from base station 115, base station 115 commands remote unit 125 to operate on a different frequency supported by base station 115. Base station 115 begins transmitting and attempts to receive the remote unit transmitted signal at the new frequency. Alternatively, a hard handoff could occur between a first frequency of base station 115 and a second frequency of base station 110. Neither of the two types of hard handoff require any intersystem communication.

Referring again to FIG. 2, the first mobile switching center (MSC-I) controls the routing of telephone calls from the PSTN to the appropriate base station $B_{1A}$–$B_{1E}$ for transmission to the designated remote unit. MSC-I also controls the routing of calls from the remote units within the coverage area, via at least one base station, to the PSTN. MSC-II operates in a like manner to govern the operation of the base stations $B_{2A}$–$B_{2E}$ to route calls between the PSTN and base stations $B_{2A}$–$B_{2E}$. Control messages and the like may be communicated between MSC-I and MSC-II over an intersystem data link 34 using an industry standard such as IS-41 or subsequent revisional standard.

When a remote unit is located within the coverage area of an internal base station, the remote unit is programmed to monitor the pilot signal transmissions from a set of neighboring base station. Consider a case in which the remote unit is located within coverage area $C_{1D}$, but is approaching coverage area $C_{2D}$. In this instance the remote unit could begin to receive usable signal levels from base station $B_{2D}$ which would then be reported to base station $B_{1D}$ and to any other base station(s) with which the remote unit is currently in communication. The time at which usable signal levels are being received by a remote unit may be determined by measuring one or more quantifiable parameters (e.g., signal strength, signal to noise ratio, frame error rate, frame erasure rate, bit error rate, and/or relative time delay) of the received signal. In the preferred embodiment, the measurement is based on the pilot signal strength as received by the remote unit. After such detection of usable received signal levels at the remote unit, and reporting thereof to base station $B_{1D}$ using a signal strength or quality message, a same frequency remote unit-assisted hard handoff from base station $B_{1D}$ to base station $B_{2D}$ could then proceed as follows:

(i) Base station $B_{1D}$ relays the remote unit's reported signal level received from base station $B_{2D}$ to MSC-I, which is aware that base station $B_{2D}$ is controlled by MSC-II;

(ii) MSC-I requests channel resources and intersystem trunk facilities between the two systems at base station $B_{2D}$ from MSC-II over intersystem data link 34;

(iii) MSC-II responds to the request by furnishing information to MSC-I, via intersystem data link 34, which identifies the channel on which communication is to be established as well as other information. In addition, the controller reserves within base station $B_{2D}$ the designated channel for communication with the remote unit and trunk resources;

(iv) MSC-I supplies the new channel information to the remote unit via base station $B_{1D}$, and specifies a time at which the remote unit is to begin communication with base station $B_{2D}$;

(v) Communication is established via hard handoff between the remote unit and base station $B_{2D}$ at the specified time; and (vi) MSC-II acknowledges to MSC-I the successful transition of the remote unit into the system.

One difficulty with this approach is that MSC-I is unaware of whether the signal from the remote unit is received by base station $B_{2D}$ at a sufficient level to support communication at the time. The MSC-I commands the remote unit to establish communication with base station $B_{2D}$. Likewise, base station $B_{2D}$ may not as yet be receiving a usable signal level from the remote unit. As a result, the call connection may be dropped during the process of transferring control to MSC-II. If the call connection is dropped, an error message rather than an acknowledgment would be sent from MSC-II to MSC-I.

Figure 4A:
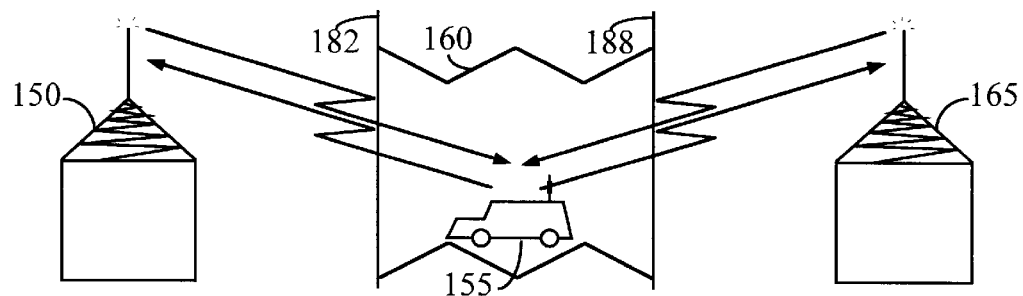
FIG. 4A show a highly idealized representation of the hard handoff region of an FM system.

Another difficulty in providing for hard handoff is the nature of the coverage area boundaries of the CDMA system. In an FM system, such as AMPS, the coverage area overlap regions are rather broad. The coverage area overlap region is the area in which communication can be supported between a remote unit and either one of two different base stations alone. In the FM system such coverage areas overlap regions must be broad because hard handoffs can only occur successfully when the remote unit is located in a coverage area overlap region. For example, FIG. 4A is a highly idealized representation of an FM system. Base station 150 and base station 165 are capable of providing forward and reverse link FM communication to remote unit 155. (The forward link refers to the connection from the base station to the remote unit. The reverse link refers to the connection from the remote unit to the base station.) Within region 160, the signal strength from both base station 150 and base station 165 is a sufficient level to support communication with remote unit 155. Note that due to the nature of the FM system, base stations 150 and 165 cannot communicate simultaneously with remote unit 155. When a hard handoff from base station 150 to base station 165 occurs within region 160, a new frequency is used for the communication between base station 165 and remote unit 155 than was used between base station 150 and remote unit 155. Base station 165 never transmits on any frequency used by base station 150 and thus base station 165 provides nominally no interference to the communication between base station 150 and any remote unit with which it is in communication. Boundary 182 indicates the location beyond which communication from base station 165 to remote unit 155 is not possible. Likewise boundary 188 indicates the location beyond which communication from base station 150 to remote unit 155 is not possible. Obviously FIG. 4A, as well as FIGS. 4B and 4C, are not drawn to scale and in reality the coverage area overlap regions are relatively narrow as compared to the total coverage area of each base station.

With the CDMA soft handoff, the existence of a coverage area overlap region in which communication can be supported completely by just one of two base stations is not critical. In the region where soft handoff occurs, it is sufficient that reliable communication can be maintained if communication is established simultaneously with two or more base stations. In the CDMA system, typically the active and neighbor base stations operate at the same frequency. Thus as the remote unit approaches a coverage area of a neighbor base station, the signal levels from active base station fall and the interference levels from the neighbor base station increase. Because of the increasing interference from the neighbor base stations, if soft handoff is not established, the connection between the active base station and the remote unit may become jeopardized. The connection is especially jeopardized if the signal fades with respect to the active base station and not with respect to the neighbor base station.

Figure 4B:
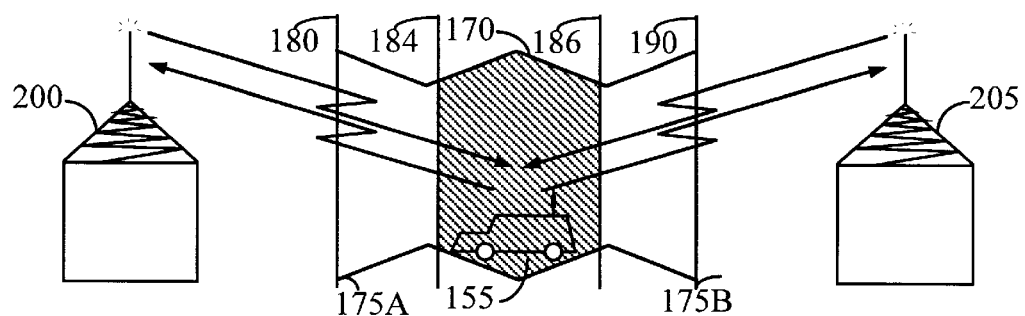
FIG. 4B show a highly idealized representation of the hard and soft handoff region of a CDMA system.
Figure 4C:
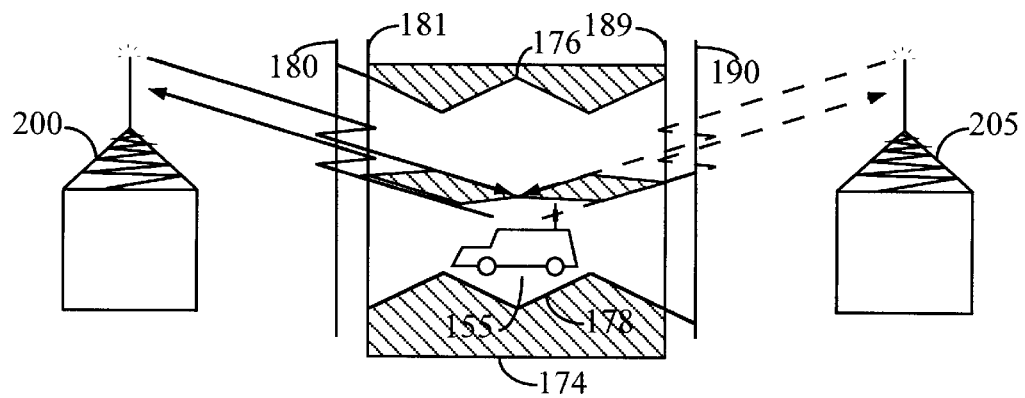
FIG. 4C shows a highly idealized representation of the handoff region corresponding to a CDMA to CDMA different frequency handoff.

FIG. 4B is a highly idealized representation of a CDMA system. CDMA base station 200 and CDMA base station 205 are capable of providing forward and reverse link CDMA communication to remote unit 155. Within darkest region 170, the signal strength from both base station 200 and base station 205 is a sufficient level to support communication with remote unit 155 even if communication is established with only one of base station 200 or base station 205. Beyond boundary 184, communication through only base station 205 is not reliable. Likewise beyond boundary 186 communication through only base station 200 is not reliable.

Regions 175A, 170, and 175B represent the areas in which it is likely that a remote unit is in soft handoff between base stations 200 and 205. Establishing communication through both base station 200 and 205 improves the overall reliability of the system even if the communication link with a remote unit within region 175A to base station 205 is not reliable alone to support communication. Beyond boundary 180, the signal levels from base station 205 are insufficient to support communication with remote unit 155 even in soft handoff. Beyond boundary 190, the signal levels from base station 200 are insufficient to support communication with remote unit 155 even in soft handoff.

Note that FIGS. 4A and 4B are drawn with reference to each other. The reference numerals used to designate boundaries 180, 182, 184, 186, 188, and 190 increase in value with increasing distance from base station 150 and base station 200. As such, the soft handoff region between boundaries 180 and 190 is the widest region. The FM coverage area overlap region between boundaries 182 and 188 lies within the CDMA soft handoff region. The CDMA 'hard handoff' region is the most narrow region between boundaries 184 and 186.

Note that if base station 200 belongs to a first system and base station 205 belongs to a second system, base stations 200 and base station 205 may not be capable of simultaneous communication with remote unit 155. Thus if communication needs to be transferred from base station 200 to base station 205, a hard handoff from base station 200 to base station 205 needs to be executed. Note that the remote unit must be located in the CDMA hard handoff region between boundaries 184 and 186 in region 170 for the hard handoff to have a high probability of success. The difficulty lies in the fact that hard handoff region 170 can be severely narrow and the time it takes for remote unit 155 to move into and out of hard handoff region 170 can be very small. In addition, it is difficult to discern whether remote unit 155 is within hard handoff region 170. Once it has been determined that remote unit 155 is in the hard handoff region 170, a decision must be made whether, to which base station, and when the hard handoff should occur. The present invention addresses these problems.

Figure 5:
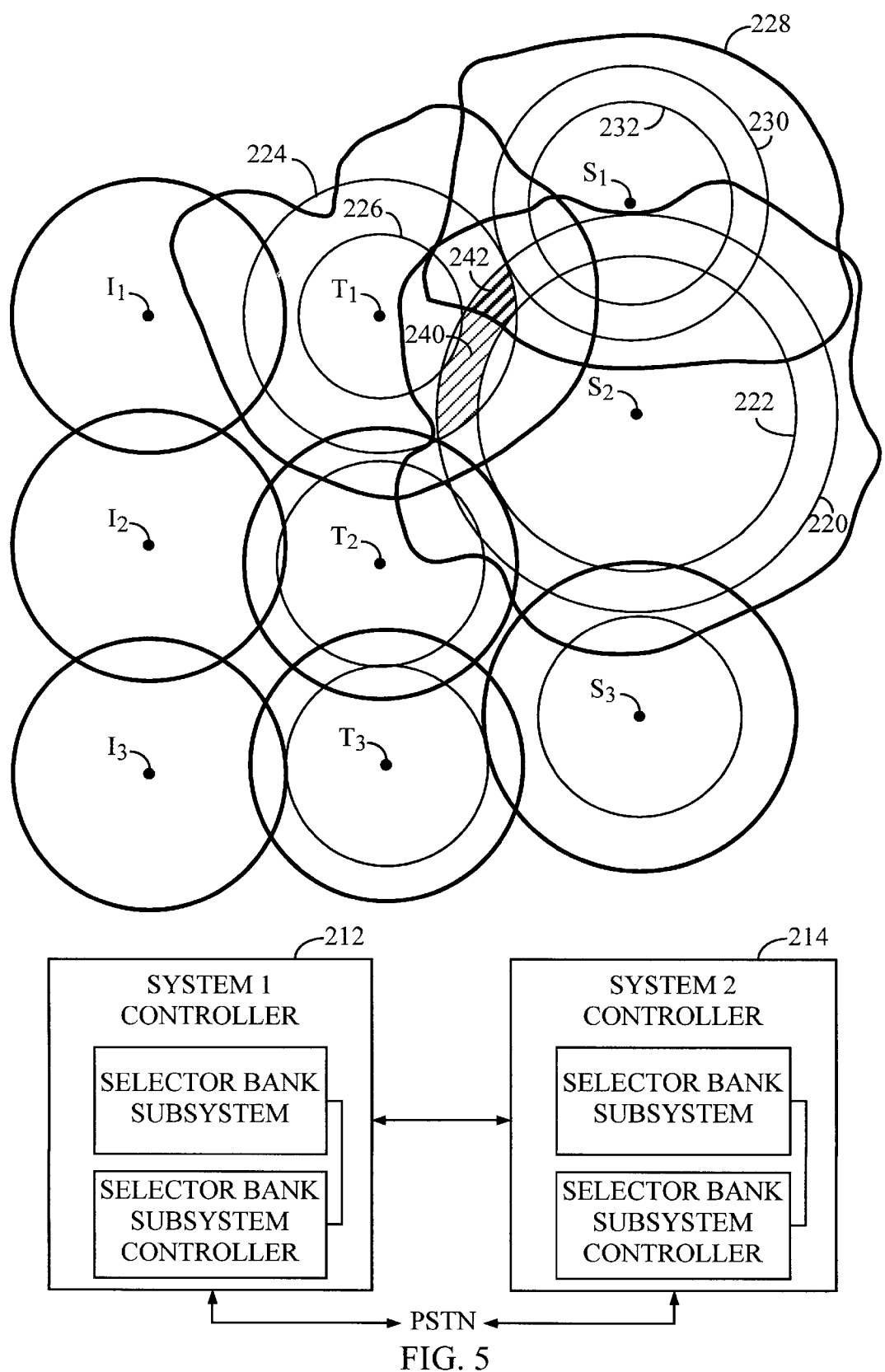
FIG. 5 shows a set of interior, transition, and second system base stations and is used to illustrate the function of the remote unit measurement directed hard handoff table.

The first aspect of the present invention is a system and method for determining the regions within the coverage area where hard handoff is both necessary and likely to be accomplished successfully and to which of the base stations should the hard handoff be attempted. The hexagonal tiled arrangement shown in FIG. 3 is highly idealized. When systems are actually deployed the resulting coverage areas have much different shapes. FIG. 5 shows a more realistic representation of a set of base stations. Base stations $T_1 - T_3$ and base stations $I_1-I_3$ are part of a first communication system controlled by system 1 controller 212. Base stations $I_1-I_3$ are interior base stations which border only with other base stations of the same system. Base stations $T_1 - T_3$ are transition or border base stations having coverage areas which abut the coverage areas of base stations belonging to a different operating system. Base stations $S_1-S_3$ are part of a second system controlled by system 2 controller 214. The outermost, thick concentric circles enclosing base station $S_3$, base stations $I_1-I_3$, and base stations $T_2 - T_3$ indicate the idealized coverage areas of the base stations in which it is possible to establish communication with the corresponding base station. The outermost, thick wavy lines encircling base stations $S_1-S_2$ and base station $T_1$ show more realistic coverage areas of the corresponding base stations. For example wavy line 228 represents the coverage area of base station $S_1$. The shape of the coverage areas is greatly effected by the terrain in which the base station resides such as the height at which the antennas are mounted, the number, reflectivity, and height of tall buildings in the coverage area, and as well as trees, hills and other obstacles within the coverage area. Realistic coverage areas are not shown for each base station to simplify the drawing.

Figure 6:
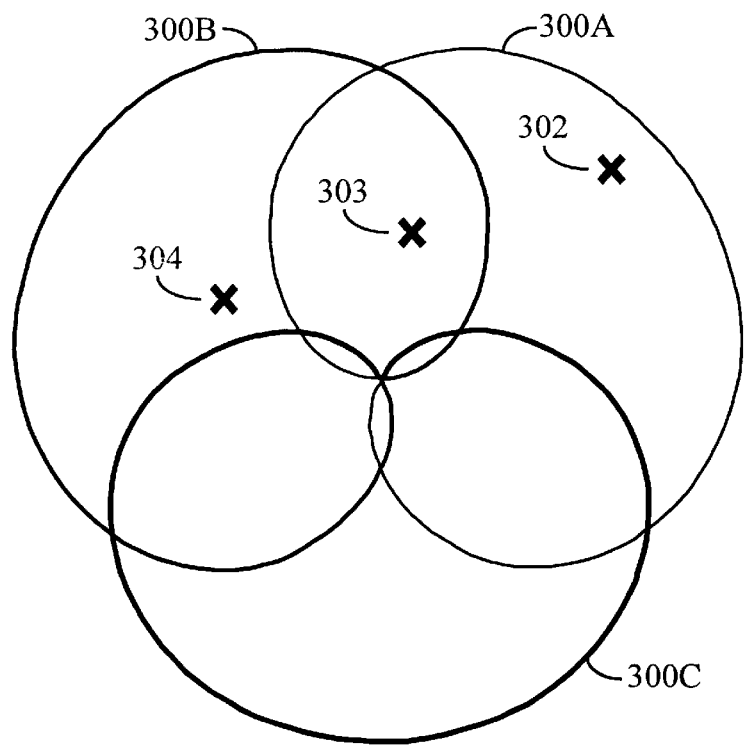
FIG. 6 shows an antenna pattern for a three sectored base station.

In an actual system, some of the base stations may be sectorized such as into three sectors. FIG. 6 shows an antenna pattern for a three sectored base station. No three sectored base stations are shown in FIG. 5 in order to simplify the drawing. The concepts of the present invention are directly applicable to sectorized base stations.

In FIG. 6 coverage area 300A is represented by the finest width line. Coverage area 300B is represented by the medium width line. Coverage area 300C is represented by the heaviest line. The shape of the three coverage areas shown in FIG. 6 is the shape produced by standard directional dipole antennas. The edges of the coverage areas can be thought of as the location at which a remote unit receives the minimum signal level necessary to support communication through that sector. As a remote unit moves into the sector, the signal strength received from the base station as perceived by the remote unit increases. A remote unit at point 302 may communicate through sector 300A. A remote unit at point 303 may communicate through sector 300A and sector 300B. A remote unit at point 304 communicates through sector 300B. As a remote unit moves past the edge of the sector, communication through that sector may degrade. A remote unit operating in soft handoff mode between the base station in FIG. 6 and an unshown neighboring base station is likely to be located near the edge of one of the sectors.

Figure 3:
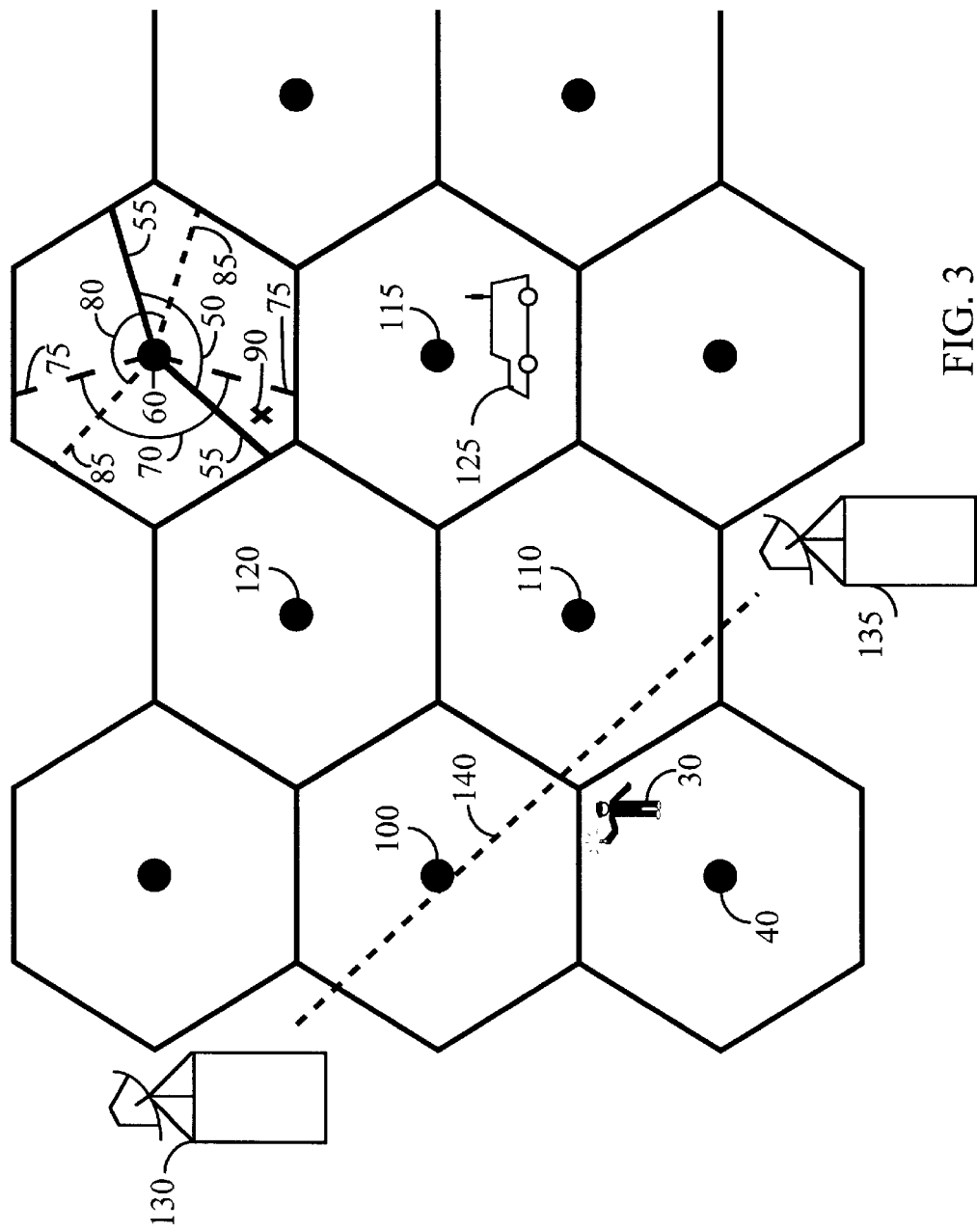
FIG. 3 shows a cellular communication system collocated with a point to point microwave link between two directional microwave antennas.

Base station 60 of FIG. 3 represents a more idealized three sectored base station. Base station 60 has three sectors, each of which covers more than 120 degrees of the base station coverage area. Sector 50, having a coverage area indicated by the unbroken lines 55, overlaps the coverage area of sector 70, having a coverage area indicated by the coarse dashed lines 75. Sector 50 also overlaps the sector 80, having a coverage area as indicated by the fine dashed lines 85. For example, location 90 as indicated by the X is located in both the coverage area of sector 50 and sector 70.

In general a base station is sectorized to reduce the total interference power to remote units located within the coverage area of the base station while increasing the number of remote units that can communicate through the base station. For example, sector 80 would not transmit a signal intended for a remote unit at location 90 and thus no remote unit located in sector 80 is significantly interfered with by the communication of a remote unit at location 90 with base station 60.

For a remote unit positioned at location 90, the total interference has contributions from sectors 50 and 70 and from base stations 115 and 120. A remote unit at location 90 might be in softer handoff with sectors 50 and 70. A remote unit at location 90 may simultaneously be in soft handoff with either or both of base stations 115 and 120.

Remote unit assisted soft handoff operates based on the pilot signal strength of several sets of base stations as measured by the remote unit. The Active Set is the set of base stations through which active communication is established. The Neighbor Set is a set of base stations surrounding an active base station comprising base stations that have a high probability of having a signal strength of sufficient level to establish communication. The Candidate Set is a set of base stations having a pilot signal strength at a sufficient signal level to establish communication.

When communications are initially established, a remote unit communicates through a first base station and the Active Set contains only the first base station. The remote unit monitors the pilot signal strength of the base stations of the Active Set, the Candidate Set, and the Neighbor Set. When a pilot signal of a base station in the Neighbor Set exceeds a predetermined threshold level, the base station is added to the Candidate Set and removed from the Neighbor Set at the remote unit. The remote unit communicates a message to the first base station identifying the new base station. The system controller decides whether to establish communication between the new base station and the remote unit. Should the system controller decide to do so, the system controller sends a message to the new base station with identifying information about the remote unit and a command to establish communications therewith. A message is also transmitted to the remote unit through the first base station. The message identifies a new Active Set that includes the first and the new base stations. The remote unit searches for the information signal transmitted by the new base station and communication is established with the new base station without termination of communication through the first base station. This process can continue with additional base stations.

When the remote unit is communicating through multiple base stations, it continues to monitor the signal strength of the base stations of the Active Set, the Candidate Set, and the Neighbor Set. Should the signal strength corresponding to a base station of the Active Set drop below a predetermined threshold for a predetermined period of time, the remote unit generates and transmits a message to report the event. The system controller receives this message through at least one of the base stations with which the remote unit is communicating. The system controller may decide to terminate communications through the base station having a weak pilot signal strength.

The system controller upon deciding to terminate communications through a base station generates a message identifying a new Active Set of base stations. The new Active Set does not contain the base station through which communication is to be terminated. The base stations through which communication is established send a message to the remote unit. The system controller also communicates information to the base station to terminate communications with the remote unit. The remote unit communications are thus routed only through base stations identified in the new Active Set.

When a remote unit is in soft handoff, the system controller receives decoded packets from each of the base stations which is a member of the Active Set. From the set of signals, the system controller must create a single signal for transmission to the PSTN. Within each base station, signals received from a common remote unit may be combined before they are decoded thus taking full advantage of the multiple signals received. The decoded result from each base station is provided to the system controller. Once a signal has been decoded it cannot be easily and advantageously 'combined' with other signals. In the preferred embodiment, the system controller must select between the plurality of decoded signals corresponding one-to-one to a base station with which communication is established. The most advantageous decoded signal is selected from the set of signals from the base stations and the other signals are simply discarded.

In addition to soft handoff, the system may also employ "softer" handoff. Softer handoff refers generally to handoff between sectors of a common base station. Because sectors of a common base station are much more intimately connected, handoff between sectors of a common base station can be done by combining undecoded data rather than by selection of decoded data. The present invention applies equally whether or not softer handoff is employed within either system. The process of softer handoff is described in U.S. patent application Ser. No. 08/405,611, entitled "METHOD AND APPARATUS FOR PERFORM- ING HANDOFF BETWEEN SECTORS OF A COMMON BASE STATION" filed Mar. 13, 1995 which is a continuation of U.S. patent application Ser. No. 08/144,903 filed Oct. 10, 1993 now abandoned, each of which are assigned to the assignee of the present invention.

In the preferred embodiment, the selection process is performed by the system controller within a selector bank subsystem (SBS). The SBS is comprised of a set of selectors. Each selector handles the active communication for one remote unit. At the termination of a call connection, the selector can be assigned to another active remote unit. The selector provides all manner of control functions for both the remote unit and the base stations. The selector sends and receives messages from the base stations. An example of such a message is the message sent by the base station each time the round trip delay between the base station and the remote unit changes by a threshold amount. The selector can also command the base station to send a message to the remote unit. An example of such a message is a message sent to the base station commanding it to command the remote unit to provide a Pilot Strength Measurement Message (PSMM). The use of both of these signals is explained more fully below. In the most general embodiment, it need not be a selector which controls the handoff process and any manner of communication control unit can perform the functions that in the preferred embodiment are delegated to the selector.

When a remote unit has established communication with a base station, the base station can measure the round trip delay (RTD) associated with the remote unit. The base station aligns in time its transmission to the remote unit based on universal time. The signal is transmitted from the base station to the remote unit over the wireless air link. The transmitted signal requires some time to travel from the base station to the remote unit. The remote unit uses the signal that it receives from the base station to align the transmission that it sends back to the base station. By comparing the time alignment of the signal that the base station receives from the remote unit to the alignment of the signal that the base station sent to the remote unit, the base station can determine the round trip delay. The round trip delay can be used to estimate the distance between the base station and the remote unit. According to the preferred embodiment, the base station reports the round trip delay to the selector whenever the round trip delay changes by more than a predetermined amount.

One aspect of the present invention uses the round trip delay between the remote unit and base stations which are members of the Active and Candidate Sets to identify the location of a remote unit. Obtaining the round trip delay between the remote unit and a base station which is a member of the Candidate Set is somewhat more complicated than determining the round trip delay of a member of the Active Set. Because a base station which is a member of the Candidate Set does not demodulate a signal from the remote unit, the round trip delay cannot be measured directly by the Candidate base stations.

The message sent from the remote unit to the base station comprising the pilot signal information of the members of the Candidate and Active Sets is referred as a Pilot Strength Measurement Message (PSMM). A PSMM is sent by the remote unit either in response to a request from the base station or because the signal strength of a base station of the Neighbor Set has exceeded a threshold or the signal strength of a base station in the Candidate Set has exceeded the strength of one of the base stations of the Active Set by a predetermined amount, or due to the expiration of a handoff drop timer.

Four parameters control the soft handoff process. First, the pilot detection threshold, T_ADD, specifies the level which the pilot signal strength of a base station which is a member of the Neighbor Set must exceed to become classified as a member of the Candidate Set. The pilot drop threshold, T_DROP, specifies the level below which the pilot signal strength of a base station which is a member of the Active or Candidate Set must fall in order to trigger a timer. The duration of the triggered timer is specified by T_TDROP. After the time specified by T_TDROP has passed, if the pilot signal strength is still below the T_DROP level, the remote unit initiates removal of the corresponding base station from the set to which it currently belongs. The Active Set versus Candidate Set comparison threshold, T_COMP, sets the amount by which the pilot signal strength of a member of the Candidate Set must exceed the pilot signal strength of a member of the Active Set to trigger a PSMM. Each of these four parameter is stored in the remote unit. Each of these four parameters can be reprogrammed to a new value by a message sent from the base station.

The PSMM includes two pieces of information which are pertinent to the present invention. The PSMM comprises a record for each pilot signal corresponding to a base station which is a member of the Active or Candidate Set. First, the PSMM comprises a measure of signal strength. Second, the PSMM comprises a measure of the pilot signal phase. The remote unit measures the pilot signal phase for each pilot signal in the Candidate Set. The pilot signal phase is measured at the remote unit by comparing the phase of the earliest arriving usable multipath component of the candidate pilot signal to the earliest arriving usable multipath component of a member of the Active Set. The pilot signal phase may be measured in relative PN chips. The pilot signal of the base station in the Active Set providing the earliest arriving signal is referred to as the reference pilot signal.

The system controller can translate the pilot signal phase into an estimate of round trip delay using the following equation:

$$RTD_{can1} = RTD_{ref} + 2*(PilotPhase_{can1} - ChannelOffset_{can1} * PilotInc) \qquad \text{Eq. 1}$$

where:

$RTD_{can1}$=the calculated estimate of the round trip delay of a base station having an entry in the Candidate Set;

$RTD_{ref}$=the round trip delay reported for the reference pilot signal;

$PilotPhase_{can1}$=the phase relative to the remote unit's perceived universal time reported in the PSMM in units of PN chips;

$ChannelOffset_{can1}$=the channel offset of the candidate base station which is a unitless number; and PilotInc=the system wide pilot sequence offset index increment in units of PN chips per channel.

The round trip delay reported for the reference pilot signal, $RTD_{ref}$, is provided by the corresponding base station to the selector. The round trip delay for the reference pilot signal serves as the basis for estimating the round trip delay between the remote unit and the base station which is a member of the Candidate Set. Remember in the preferred embodiment, each base station transmits the same pilot sequence offset in time such that the remote unit can identify a base station based on the code phase offset of the pilot signal. The pilot sequence offset index increment, PilotInc, is code phase offset increment by which the base station pilot signals are offset. The channel offset, $ChannelOffset_{can1}$, of the candidate base station designates which of the code phases is assigned to the candidate base station. The relative phase of the candidate base station, PilotPhase$_{can1}$, is the code phase offset of the candidate base station as measured by the remote unit as compared to the reference pilot signal in units of PN chips. PilotPhase$_{can1}$ is reported to the base station in the PSMM. ChannelOffset$_{can1}$ and PilotInc are known to the selector.

If there were no delay in transmission in the system, the phase of the candidate base station would be the product of the channel offset, ChannelOffset$_{can1}$, and the system wide pilot sequence offset index increment, PilotInc. Because there are transmission delays in the system, the remote unit perceives both the reference pilot signal and the candidate base station pilot signal with different and varying delay. Subtracting the system induced PN offset (=the product of ChannelOffset$_{can1}$ and PilotInc) from the perceived PN offset (=PilotPhase$_{can1}$) yields the relative offset between the reference pilot signal and the pilot signal of the candidate base station. If the difference is negative, the RTD between the reference base station and the remote unit is larger than the RTD between the candidate base station and the remote unit. The difference perceived by the remote unit reflects only the forward link relative delay. The forward link relative delay is doubled to account for the full round trip delay.

For the sake of the example, assume that the system-wide pilot sequence offset index increment is 64 PN chips and that the following information is used for the basis of a round trip delay measurement.

| | | |
|---|---|---|
| PilotPhase$_{ref}$ = 0 | RTD = 137 | (Base station Id = 12) |
| PilotPhase$_{14}$ = 948 | RTD = 244 | (Base station Id = 14, relative offset 52 PN) |
| PilotPhase$_{16}$ = 1009 | | (Base station Id = 16, relative offset –15 PN) |

Because in the preferred embodiment, each base station or base station sector transmits the same pilot sequence offset in time, the base station identification can be thought of as the channel PN offset used by the base station to transmit the pilot signal. Further assume that base stations 12 and 14 (which may be assumed to refer to the base stations shown in FIG. 1) are members of the Active Set and the RTD measurements as measured by base stations 12 and 14 are being reported as 137 and 244 PN chips respectively.

Noted to the right of the pilot phase and the round trip delay data for base station 14 is the calculated relative offset. The measured pilot phase of base station 14 is 948 PN chips. The fixed offset of base station 14 is equal to the base station ID (14) times the pilot sequence offset increment (64) which is equal to 896 PN chips. The difference between the measured pilot phase and the pilot phase offset of the base station is the relative offset between the base station and the remote unit which in this case is 52 PN chips (=948–896). It is unnecessary to use these numbers to calculate the round trip delay between base station 14 and the remote unit because the base station 14 makes a round trip delay measurement directly because base station 14 is a member of the Active Set.

However because base station 16 is a member of the Candidate Set, no round trip delay measurement is made directly by the base station 16 and Equation 1 above must be used to determine the round trip delay. For base station 16 the parameters are:

RTD$_{ref}$=137 PN chips;
PilotPhase$_{can1}$=1009 PN chips;
ChannelOffset$_{can1}$=16; and
PilotInc=64 PN chips per channel.

Plugging these numbers directly into Equation 1 yields a round trip delay between the remote unit and base station 16 of 107 PN chips. As noted above, to find the absolute offset of the candidate base station, the product of the ChannelOffset$_{can1}$ and the PilotInc is subtracted from PilotPhase$_{can1}$ which in this case yields –15 PN chips. One interesting note is that the round trip delay between base station 16 and the remote unit is less than the round trip delay between base station 12.

A first method of identifying the location of the remote unit relies on the use of special remote unit measurement directed hard handoff (MDHO) state. In order to minimize the processing impact, the system enters the MDHO state only when any member of the Active Set is marked as a transition base station. In an alternative embodiment, the system enters the MDHO state only when all members of the Active Set are transition base stations. In yet a third embodiment, the system enters the MDHO state only when there is a single base station in the Active Set and that base station is a transition base station. In a fourth embodiment, sufficient processing resources exists such that the MDHO state is always active. While in the MDHO state, the selector monitors the round trip delay of the members of the Active Set and computes the round trip delay for the members of the Candidate Set. After the conditions which trigger the MDHO state have changed, the MDHO state may be exited.

MDHO state is based on the use of a MDHO table. In the MDHO table each row represents a section of the coverage area region which is a coverage area overlap region. As defined above, a coverage area overlap region is an area in which communication could be supported between a remote unit and either one of two different base stations alone. Each row contains a list of pairs of base station identification numbers and round trip delay ranges. The round trip delay range is specified in terms of a minimum and maximum round trip delay.

In order to use the MDHO table, either a network planning tool or empirical data is used to identify a set of regions and the corresponding appropriate action for each region. Alternatively, a rule based or expert system could be used to generate the MDHO table. As noted above, FIG. 5 shows a set of interior, transition, and second system base stations and is used to illustrate the function of the remote unit MDHO table. The shaded lines around the base stations indicate round trip delay measurement thresholds. For example, shaded line 222 encircling base station $S_2$ represents the location at which a direct path from base station $S_2$ to a remote unit located on shaded line 222 exhibits a round trip delay of 200 PN chips. Shaded line 220 encircling base station $S_2$ represents the location at which a direct path from base station $S_2$ to a remote unit located on shaded line 222 exhibits a round trip delay of 220 PN chips. Therefore any remote unit located between shaded line 220 and shaded line 222 would exhibit a round trip delay between 200 and 220 PN chips.

Likewise, shaded line 226 encircling base station $T_1$ represents the location at which a direct path from base station $T_1$ to a remote unit located on shaded line 226 exhibits a round trip delay of 160 PN chips. Shaded line 224 encircling base station $T_1$ represents the location at which a direct path from base station $T_1$ to a remote unit located on shaded line 224 exhibits a round trip delay of 180 PN chips. Therefore any remote unit located between shaded line 224 and shaded line 226 would exhibit a round trip delay between 160 and 180 PN chips.

Also, shaded line 232 encircling base station $S_1$ represents the location at which a direct path from base station $S_1$ to a remote unit located on shaded line 232 exhibits a round trip delay of 170 PN chips. Shaded line 230 encircling base station S₁ represents the location at which a direct path from base station S₁ to a remote unit located on shaded line 230 exhibits a round trip delay of 180 PN chips. Therefore any remote unit located between shaded line 230 and shaded line 232 would exhibit a round trip delay between 170 and 180 PN chips with respect to base station S₁.

As noted above, multipath signals which do not take a direct path between the remote unit and the base station are produced by the reflective elements within the environment. If the signal does not take a direct path, the round trip delay is increased. The earliest arriving signal is the signal that has taken the shortest path between the remote unit and the base station. It is the earliest arriving signal that is measured in conjunction with the present invention to estimate the round trip delay.

Note that specific regions can be identified by the round trip delays between the various base stations. For example, coverage regions 240 and 242 can be identified by the fact at the round trip delay between the remote unit and base station T₁ is between 160 and 180 PN chips and the round trip delay between the remote unit and base station S₂ is between 200 and 220 PN chips. Coverage area 242 is further defined by the fact that a pilot signal from base station S₁ can be perceived at all no matter what the round trip delay. Assume that the proper action for a remote unit located within region 240 and currently in communication with base station T₁ is to execute a same frequency hard handoff to CDMA base station S₂. Further assume that in region 242 the total interference is so high that the only alternative is to execute a hard handoff to the AMPS system supported by base station S₁.

Table I illustrates a portion of an exemplary MDHO table. The first column indicates which coverage area overlap region corresponds to the row in the MDHO table. For example coverage area 242 corresponds to coverage region N on Table I and coverage area 240 corresponds to coverage area N+1 on Table I. Note that a remote unit located in coverage area 242 matches the parameters given for coverage area 240. In the illustrative embodiment, the MDHO table is traversed in numerical order and the first region which matches the given parameters is selected so that the only way that a given set of parameters is compared to region N+1 is if region N has already been eliminated as a possible location. The second column contains a first base station ID. The third column contains the range of round trip delays which correspond to the coverage region designated by the row. The fourth and fifth columns show a second base station ID and round trip delay pair as do the sixth and seventh columns. More columns designating base station ID and round trip delay pairs may be added as needed.

In the preferred embodiment, the MDHO table is stored in a selector bank subsystem controller (SBSC). The SBSC already stores the pilot data base which provides the neighbor lists and pilot offset and other such data needed for standard operation. In the preferred embodiment, the selector requests that the SBSC access the MDHO table each time that a new PSMM is received and whenever the RTD measurement for any of the active base station changes by a significant amount.

| Coverage Region | BSId [1] | RTDRange [1] | BSId [2] | RTDRange [2] | BSId [3] | RTDRange [3] | Action | System ID | Target BSId |
|---|---|---|---|---|---|---|---|---|---|
| . | | | | | | | | | |
| . | | | | | | | | | |
| . | | | | | | | | | |
| N | T1 | 160, 180 | S2 | 200, 220 | S1 | 0, 1000 | HO to AMPS | Sys 2 | S1 |
| N + 1 | T1 | 160, 180 | S2 | 200, 220 | | | HO to CDMA | Sys 2 | S2 |
| N + 2 | T2 | 160, 180 | S2 | 200, 220 | | | HO to CDMA | Sys 2 | S2 |
| N + 3 | T2 | 160, 200 | T3 | 0, 1000 | | | HO to Dif. Freq CDMA | Sys 1 | T2 |
| N + 4 | T2 | 200, 240 | S3 | 190, 210 | S2 | 200, 240 | HO to Amps | Sys 1 | T2 |
| . | | | | | | | | | |
| . | | | | | | | | | |

The column labeled action describes the action that should be taken when the location of the remote unit maps to one of the coverage regions. There are several exemplary types of action which may be taken such as:

Intersystem base station CDMA-to-AMPS hard handoff;
Intrasystem base station CDMA-to-AMPS hard handoff;
Intrasystem base station CDMA-to-CDMA hard handoff;
Intersystem CDMA-to-different frequency CDMA hard handoff; and
Intersystem CDMA-to-same frequency CDMA hard handoff.

If more round trip delay information is needed to identify the location of the remote unit, the T_ADD and the T_DROP thresholds can be modified when a remote unit is in the MDHO state. By decreasing both the T_DROP and T_ADD thresholds, lower pilot signal strengths qualify the corresponding base stations for membership in the Candidate and Active Sets and lower pilot signal strengths remain in the Candidate and Active Sets longer before being dropped. The increased number of base stations listed in the Candidate Set and Active Set increases the number of round trip delay data points which can be used to locate the remote unit. Decreasing T_ADD and T_DROP system-wide can have a negative effect in that each remote unit in handoff uses system resources from two base stations. It is desirable to minimize the number of remote units in handoff in order to conserve resources at each base station and to maximize capacity. Therefore in the preferred embodiment, T_ADD and T_DROP are only decreased in value in the transition base stations. Also the length of time designated by T_TDROP can be increased to increase the amount of time that a base station remains in the Active Set after falling below T_DROP.

In the preferred embodiment if the second system is not already transmitting a CDMA pilot signal from the border base stations on the frequency being used in the first system, the second system is modified to transmit a pilot signal or other CDMA beacon to aid initiation of the hard handoff process as detailed in the above mentioned U.S. patent application Ser. No. 08/413,306 and U.S. patent application Ser. No. 08/522,469. In an alternative embodiment, even if the system is not already transmitting a CDMA pilot signal from the border base station, the border base stations in the second system do not produce pilot signals and there are no entries in the base station ID column of the MDHO table corresponding to base stations $S-S_3$. Pilot beacon units can also be used on interior base stations to help identify the regions which are effected by point to point microwave links.

In some situations it may also be possible to eliminate the use of the candidate base stations as a means of identifying the location of the remote unit thus leaving only the active base station information to determine the remote unit location. For example with clever network planning, it may be that the coverage area overlap regions can be effectively identified using only the round trip delay of the members of the Active Set.

As noted above, no sectorized base stations are shown in FIG. 5 in order to simplify the drawing. In reality the presence of sectorization aids the location process by narrowing the regions in which the remote unit may be located. Note, for example, the geometry of base station 60 of FIG. 3. Before round trip delays are even considered, the coverage area of base station 60 is divided to 6 different regions: the area covered only by sector 50, the area covered by sector 50 and sector 70, the area covered only by sector 70, the area covered by sector 70 and sector 80, the area covered only by sector 80, and the area covered by sector 80 and sector 50. If network planning is used to orient three sectored base stations along the border between the two systems, it may be possible to eliminate the use of pilot beacons in the system 2 border base stations and the use of the candidate base station round trip delay determination.

Each base station in the system is initially calibrated such that the sum of the unloaded receiver path noise measured in decibels and the desired pilot power measured in decibels is equal to some constant. The calibration constant is consistent throughout the system of base stations. As the system becomes loaded (i.e., remote units begin to communicate with the base stations), the reverse link handoff boundary effectively moves closer in toward the base station. Therefore, to imitate the same effect on the forward link, a compensation network maintains the constant relationship between the reverse link power received at the base station and the pilot power transmitted from the base station by decreasing the pilot power as loading increases. The process of balancing the forward link handoff boundary to the reverse link handoff boundary is referred to as base station breathing is detailed in U.S. Pat. No. 5,548,812 entitled "METHOD AND APPARATUS FOR BALANCING THE FORWARD LINK HANDOFF BOUNDARY TO THE REVERSE LINK HANDOFF BOUNDARY IN A CELLULAR COMMUNICATION SYSTEM" issued Aug. 20, 1996 and assigned to the assignee of the present invention.

The process of breathing may adversely effect operation in the MDHO state. Referring again to FIG. 4B, if the power transmitted by base station 200 decreases as compared to the power transmitted by base station 205, the coverage area overlap boundaries move closer to base station 200 and further away from base station 205. The signal level does not effect the round trip delay between the remote unit at any one location and the base station. Therefore the MDHO table continues to identify the same locations as appropriate for handoff when the actual boundaries may have changed.

There are several ways of dealing with the issue of breathing. One way is to sufficiently narrow the defined coverage area overlap regions as stored in the MDHO table such that the coverage area overlap regions remain valid independent of present state of breathing.

A second way to deal with the issue of base station breathing is to disable or limit breathing at the border base stations. The breathing mechanism operates on the forward link signal to force the forward link performance to imitate the natural reaction of the reverse link to the level of loading. Therefore, the elimination of breathing does not remove the risk that the boundaries change with loading on the reverse link and thus loading remains a factor even if a system does not employ breathing.

A third way to deal with the issue of base station breathing is through network planning. If the border base stations of the second system do not transmit traffic channel signals (i.e. active remote unit specific signals) at the frequencies used by the border base stations of the first system, the effect of breathing is minimized. If the border base station transmits a pilot signal from a pilot beacon unit, the effects of breathing are also minimized because no traffic channel signals are generated when using a pilot beacon unit. The power output by a pilot beacon unit remains constant over time.

A fourth way to deal with the issue of base station breathing is through the use of a rule based system. If the border base stations are breathing, a breathing parameter is sent from each base station to the system controller. The system controller updates the MDHO table based on the current value of breathing. Typically the system controller would augment the round trip delay values in the MDHO table to reflect the effects of breathing.

The effects of breathing may not be an issue at all in most situations. Because these border areas have traditionally been a source of technical and business issues, network planning typically strives to place the boundaries between the two systems in low traffic areas. Lower amounts of traffic correspond to smaller effects of breathing.

In some cases it may be desirable to avoid storing and accessing the MDHO table. In such a case, other methods can be used to effect handoff. For example, in an alternative embodiment, two means are used to trigger a handoff. The first method is called the detection rule. Certain base stations (or base station sectors) are designated reference base stations, R. If a remote unit is within the coverage area of a reference base station and it reports detection of a triggering pilot signal, $P_B$, the selector triggers a handoff with a target base station determined by the data set $(R, P_B)$. The detection rule is typically, but not always, used with a pilot beacon unit.

The second method is called the hand-down rule. Certain base stations are marked as boundary base stations. The selector triggers a handoff if the remote unit Active Set contains only one base station and that base station is a boundary base station and the reference pilot signal round trip delay exceeds a threshold. Alternatively the selector triggers a handoff if the remote unit Active Set contains only base stations that are boundary base station and the reference pilot signal round trip delay exceeds a threshold. Typically the threshold varies between base stations and is independent of the rest of the Active Set. The hand-down action is determined by the current reference pilot. The hand-down rule may be the first in a set of rules for measurement directed handoff. Note that it is not necessary that a base station designated as a boundary base station has a coverage area which abuts a coverage area of a base station of another system. The hand-down rule can be used for both intersystem handoff and intrasystem handoff.

Both the detection rule and the hand-down rule may be dependent on the physical characteristics of the system. The use of these two rules may burden the design of the network such as the placement of the base stations, the orientation of the sectors within a multisectored base station and the physical placement of the antennas.

If a remote unit or base station attempts to initiate a call in a boundary base station, the remote unit and base station exchange an origination message on the access channel. In the preferred embodiment, the Overhead Channel Manager resides in the base station and controls the access channel. The Overhead Channel Manager examines the round trip delay estimate computed from the origination message. If the round trip delay exceeds the threshold, the Overhead Channel Manager notifies the mobile switching center which may command the base station sends the remote unit a service redirection message. The service redirection message may direct an AMPS-capable remote unit to an AMPS system or to another CDMA frequency or system. The redirection message also depends on the type of service being requested by the remote unit. If a data connection rather than a voice connection is requested, the AMPS system may not be able to support the connection. For this reason, the action taken must depend generally on the capabilities and status of the remote unit. Typically each remote unit in the system has a class designation which designates its capabilities. The current status of the remote unit may be queried by the base station and a decision can be made based on the information returned.

Figure 7:
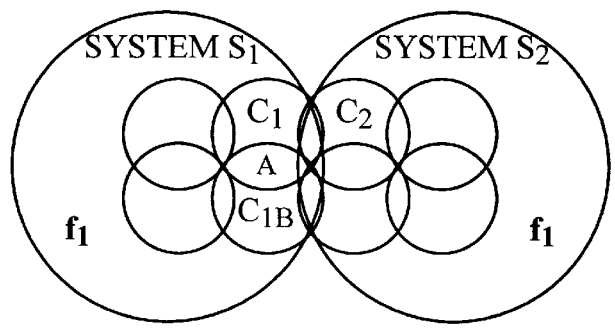
FIG. 7 illustrates the use of the detection rule in a CDMA to CDMA same frequency handoff.

FIG. 7 illustrates the use of the detection rule in a CDMA to CDMA same frequency handoff. Assume that a remote unit is traveling from system $S_1$ to system $S_2$ in the $C_{1A}/C_2$ region. As the remote unit approaches $C_2$, it begins to perceive the pilot signal transmitted thereby. Using the detection rule, if $C_{1A}$ is the reference base station, the selector requests a handoff to an AMPS base station that is collocated with coverage area $C_{1A}$. As noted above the hard handoff from an FM AMPS system to another FM AMPS system may be achieved over a much larger physical region than a hard handoff from a CDMA system to another CDMA system operating at the same frequency. Note that there must be a one to one mapping or at least a substantial over lap between the CDMA base station coverage areas and the AMPS base station coverage areas in the boundary base stations. Having switched to FM AMPS operation, the probability of a successful intersystem hard handoff between the FM system is high.

Figure 8:
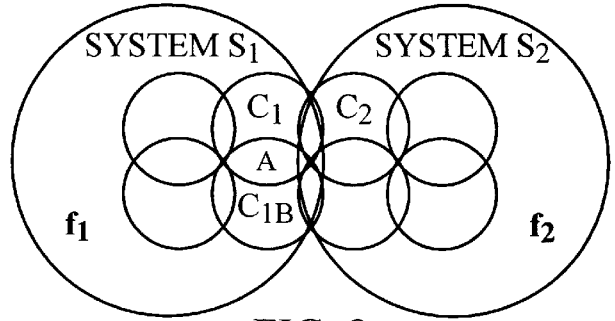
FIG. 8 illustrates the use of the detection rule in a CDMA to CDMA different frequency handoff.

FIG. 8 illustrates the use of the detection rule in a CDMA to CDMA different frequency handoff. In FIG. 8 the area corresponding to system $S_2$ is shaded to indicate that system $S_2$ is communicating with traffic channel signals at frequency $f_2$ but is not communicating with traffic channel signals at frequency $f_1$. In FIG. 8 the area corresponding to system $S_1$ is not shaded to indicate that system $S_1$ is communicating with traffic channel signals at frequency $f_1$, but is not communicating with traffic channel signals at frequency $f_2$. There may or may not be a pilot beacon unit operating in the border base stations of either system $S_1$ or system $S_2$ or both. If there is a pilot beacon unit, the detection rule can be used. Alternatively, if $C_{1A}$ and $C_{1B}$ become the only base stations in the Active Set, the hand-down rule can be applied once the round trip delay measurement exceeds the threshold. In either case a handoff could be made to a collocated AMPS base station within $C_{1A}$ or $C_{1B}$.

The configuration of FIG. 8 has a great advantageous over the configuration of FIG. 7. FIG. 4C illustrates the advantage of handoff using two different CDMA frequencies. FIG. 4C is a highly idealized representation of a handoff region employing two different CDMA frequencies following the same format as FIGS. 4A and 4B. In FIG. 4C, base station 205 is not transmitting traffic channel signals on the same frequency as base station 200 as represented by the dashed transmission arrows emanating from base station 205 and remote unit 155. Boundary 189 represents the point to which reliable communication can be established between remote unit 155 and base station 200 at frequency $f_1$. Region 176 between boundary 180 and boundary 189 represents the area where remote unit 155 can detect a pilot signal from base station 205 if base station 205 is equipped with a pilot beacon unit while communicating through base station 200.

A comparison between FIGS. 4B and 4C reveals the advantage of the different frequency handoff. If base station 205 is not transmitting a pilot signal, there is no interference from base station 205 to the signal between base station 200 and remote unit 155. If base station 205 is transmitting a pilot signal, the amount of interference due to the pilot signal from base station 205 to the signal between base station 200 and remote unit 155 is significantly less than the interference produced if base station 205 is transmitting traffic channel signals. Therefore boundary 189 is much closer to base station 205 than boundary 186.

Boundary 181 represents the point to which reliable communication can be established between remote unit 155 and base station 205 at frequency $f_2$. Region 178 between boundary 181 and boundary 190 represents the area where remote unit 155 can detect a pilot signal from base station 200 if base station 200 is equipped with a pilot beacon unit operating at frequency $f_2$ while communicating through base station 205. Again, notice how much closer boundary 181 is to base station 200 than boundary 184. Region 174 between boundary 181 and boundary 189 represents the area where a handoff of communication from base station 200 at frequency $f_1$ to base station 205 at frequency $f_2$ or vice versa can be accomplished. Notice how much larger region 174 is than region 170 in FIG. 4B. The larger size of region 174 is greatly advantageous to the hard handoff process. The fact that two different frequencies are used does not greatly effect the hard handoff process because in either the same frequency or different frequency case, the transfer of communication has the 'break before make' hard handoff characteristic. The only slight disadvantage of the different frequency case may be that the remote unit requires some amount of time to switch operation from the first frequency to the second frequency.

In the preferred embodiment, both the base station and the remote unit use a different frequency for transmission than for reception. In FIG. 4C and other figures and text describing handoff between two different CDMA operating frequencies, it may be assumed that both the transmit and receive frequencies are different after the handoff is made even if the text and drawings refer for simplicity's sake to a single frequency (such as frequency $f_1$) to designate the use of a set of transmit and receive frequencies.

Referring again to FIG. 8, it is not necessary that every base station in system $S_2$ refrain from operating at frequency $f_1$. It is only necessary that the border base stations and possibly the next layer of interior base stations in system $S_2$ refrain from operating on frequency $f_1$. The interior base stations in system $S_2$ may use frequency $f_1$ for CDMA or FM or TDMA or point to point microwave links or for any other function.

Figure 9:
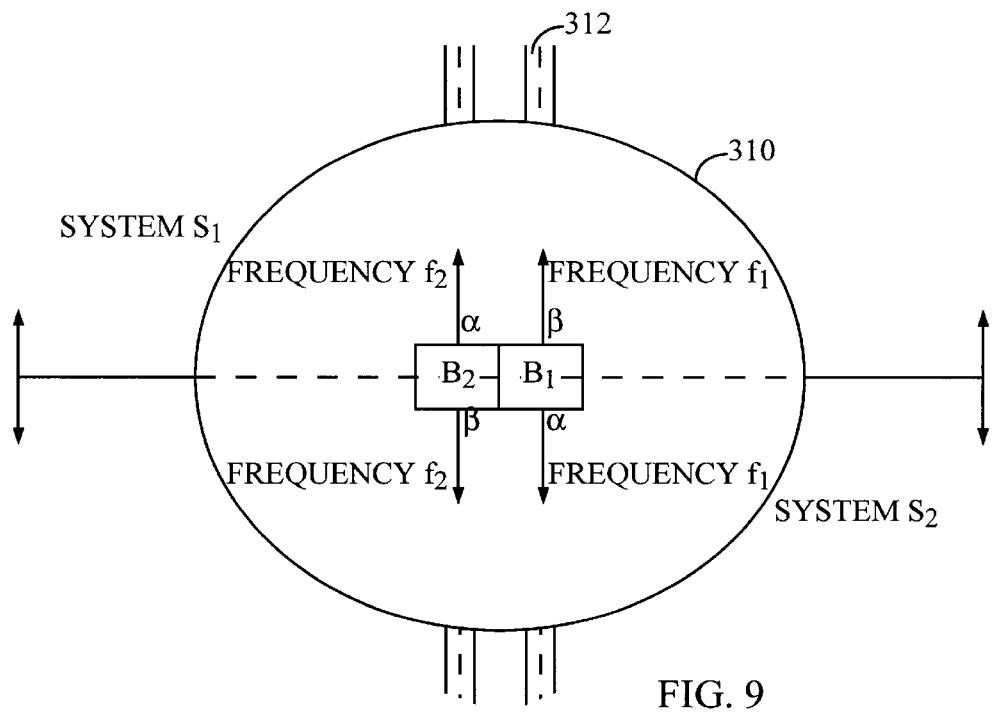
FIG. 9 illustrates two collocated base stations in a configuration providing CDMA to CDMA different frequency handoff.

FIG. 9 shows yet another alternative embodiment for a transition area between two systems. The configuration of FIG. 9 requires cooperation between the service providers of the first and second systems and may be most applicable where the two systems belong to the same service provider. FIG. 9 illustrates two collocated, or substantially collocated, base stations $B_1$ and $B_2$ providing CDMA to CDMA different frequency handoff. Both base station $B_1$ and base station $B_2$ are bi-sectored base stations providing coverage to coverage area 310. Base station $B_1$ of system $S_1$ is providing CDMA service at frequency $f_1$, in both sector $\alpha$ and sector $\beta$ and base station $B_2$ of system $S_2$ is providing CDMA service in both sector $\alpha$ and sector $\beta$ at frequency $f_2$.

Note that coverage area 310 is intersected by highway 312. As a remote unit travels into coverage area 310 from system $S_1$ using frequency $f_1$, a standard intrasystem soft handoff is used to transfer call control to base station $B_1$, sector $\beta$. As the remote unit continues down highway 312, soft or softer handoff is used to transfer communication from base station $B_1$, sector $\beta$ to base station $B_1$, sector $\alpha$. When sector $\alpha$ of base station $B_1$, becomes the only sector in the Active Set, the hand-down rule applies triggering handoff to system $S_2$ sector $\beta$ of base station $B_2$, on frequency $f_2$.

The handoff for remote unit traveling from system $S_2$ to system $S_1$ happens in a similar manner, between sector a of base station $B_2$ and sector $\beta$, of base station $B_1$. Because sector $\alpha$ of base station $B_1$ is collocated with sector $\beta$ of base station $B_2$ and sector $\alpha$ of base station $B_2$ is collocated with sector $\beta$ of base station $B_1$, in each case a hard handoff can be successfully competed without the fear that the remote unit is not in the coverage area of the target base station.

The configuration of FIG. 9 has several advantages. Because the area in which handoff from system $S_1$ to the system $S_2$ is executed is not the same as the area in which handoff from system $S_2$ to system $S_1$ is executed, the probability of a ping-pong situation is minimized. For example, if the area in which handoff from system $S_1$ to the system $S_2$ is executed is substantially the same as the area in which handoff from system $S_2$ to system $S_1$ is executed, a remote unit which enters the handoff area and then stops moving or moves within the region may continually be handing off to one system and then back to the other. The configuration of FIG. 9 introduces spatial hysteresis. Once a remote unit has transitioned control from system $S_1$ to system $S_2$ in the lower half of coverage area 310, the remote unit will not transition control back to system $S_1$ unless it changes direction and fully re-enters the upper half of coverage area 310 such that base station $B_2$ sector $\alpha$ is the only member of the remote unit's Active Set.

As with the configuration of FIG. 8, it is not necessary in the configuration of FIG. 9 that every base station in system $S_2$ refrain from using frequency $f_1$. It is only necessary that the border base stations and possibly the next layer of interior base stations in system $S_2$ refrain from using frequency $f_1$. The interior base stations in system $S_2$ may use frequency $f_1$, to transmit CDMA or FM or TDMA or point to point microwave links or for any other function. Also in FIG. 9 it is not necessary that the base station comprise exactly two sectors and a greater number of sectors could be used.

Figure 10:
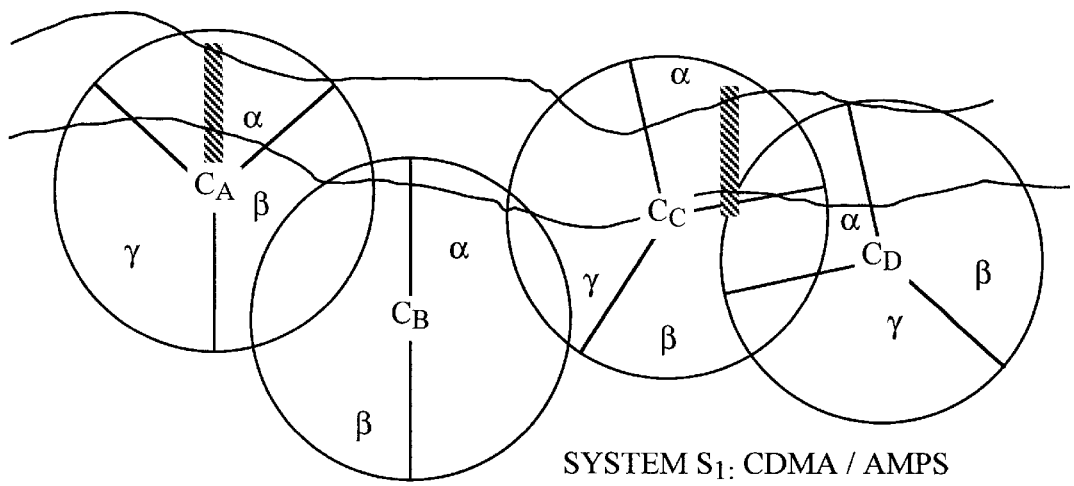
FIG. 10 illustrates handoff from a CDMA system to a system providing service using a different technology.

FIG. 10 shows a situation in which a CDMA system borders a system providing service using a different technology. This situation can be handled in a similar manner than FIG. 8. FIG. 10 shows the special topology of Detroit, Michigan, USA. Detroit abuts Canada on one side. A river defines the boundary between Detroit and Canada. A few bridges cross the river to connect the two countries.

On the USA side of the river CDMA system $S_1$ is deployed. On the Canadian side of the river, the TDMA system $S_2$ is deployed. Both the USA and Canadian sides are operating AMPS systems in addition to the chosen digital technologies. A remote unit traveling on the Detroit side of the system is continuously in CDMA coverage, possibly in soft and softer handoff. However, when the remote unit is found to be exclusively in the coverage area of sector $\alpha$ of the coverage area $C_A$ or sector $\alpha$ of the coverage area $C_C$, a handoff to the respective collocated AMPS base station is triggered once the round-trip delay exceeds a predetermined threshold, using the hand-down rule. The remote units on the water may or may not stay within the CDMA coverage areas depending on the chosen RTD threshold. Network planning must ensure that antennas are oriented properly and base stations are located in such a way that an AMPS base station can be uniquely determined based on the transition sectors and the call does not drop when these sectors become the only sectors in the Active Set.

Figure 14:
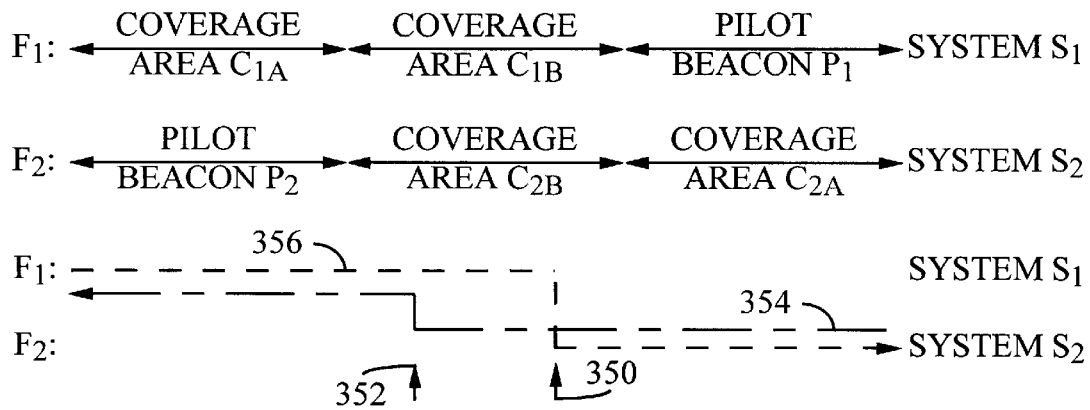
FIG. 14 represents the use of a collocated base stations to perform hard handoff.

FIG. 14 illustrates an embodiment of the present invention where the carriers operating the two systems are able to collocate two base stations. FIG. 14 is a graphical representation. Coverage area $C_{1A}$ corresponds to an interior base station in system $S_1$ operating at frequency $f_1$. Coverage area $C_{1B}$ corresponds to a transition base station in system $S_1$ operating at frequency $f_1$. Pilot beacon $P_1$ is a pilot beacon unit operating on frequency $f_1$ collocated with coverage area $C_{2A}$. Coverage area $C_{2A}$ corresponds to an interior base station in system $S_2$ operating at frequency $f_2$. Coverage area $C_{2B}$ corresponds to a transition base station in system $S_2$ operating at frequency $f_2$. Pilot beacon $P_2$ is a pilot beacon unit operating on frequency $f_2$ collocated with coverage area $C_{1A}$.

Note that in the configuration of FIG. 14, a hard handoff between base station $C_{1B}$ and base station $C_{2B}$ must be performed as a remote unit travels between system $S_1$ and system $S_2$. Because the interior base stations are not transmitting traffic channel signals at the frequencies from which a hard handoff is made, the reliability of communication between base station $C_{1B}$ at frequency $f_1$ and a remote unit located in the coverage areas $C_{1B}$ and $C_{2B}$ is high. Likewise, the reliability of communication between base station $C_{2B}$ at frequency $f_2$ and a remote unit located in the coverage areas $C_{1B}$ and $C_{2B}$ is also high.

Figure 15:
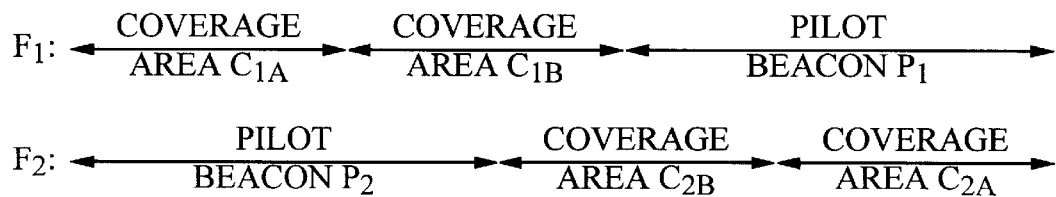
FIG. 15 represents the use of a closely located base stations having a significant portion of coverage area overlap to perform hard handoff.

One issue with the configuration of FIG. 14 is the co-location of coverage areas $C_{1B}$ and $C_{2B}$. Collocation of the base stations typically requires some amount of coordination between the two system operators. If the two systems are operated by different carriers, the carriers may not want to share a physical facility. Also the collocation may raise regulatory issues. FIG. 15 is similar to FIG. 14 except that coverage area $C_{1B}$ and coverage area $C_{2B}$ are not completely collocated. The principles of this embodiment apply to the case where the two base stations coverage areas substantially overlap. The spatial hysteresis region is shrunk approximately by the amount that the two coverage areas are offset from one another.

With either FIG. 14 or FIG. 15, the operation is the same and quite simple. A remote unit traveling in system $S_1$ toward system $S_2$ is initially in communication with coverage area $C_{1A}$ using frequency $f_1$. As the remote unit approaches the two collocated coverage areas, soft handoff at frequency $f_1$, is used to transfer communication to coverage area $C_{1B}$. If the remote unit continues toward system $S_2$, the remote unit begins to detect the pilot signal from pilot beacon $P_1$. When the Active Set contains only the base station corresponding to coverage area $C_{1B}$ and/or the pilot signal strength of pilot signal $P_1$ exceeds a certain threshold, a hard handoff from the base station corresponding to coverage area $C_{1B}$ to base station corresponding to coverage area $C_{2B}$ is performed. As the remote unit continues toward system $S_2$, soft handoff is used to transition communication between the base station corresponding to coverage area $C_{2B}$ and the base station corresponding to coverage area $C_{2A}$. The reciprocal operation is used to complete a handoff from system $S_2$ to system $S_1$.

The configurations of FIGS. 14 and 15 is similar to the configuration of FIG. 9 in that they introduce some measure of spatial hystersis. For example, the connection of a remote unit that travels from system $S_1$ to system $S_2$ is represented by dashed line 356. Note that until the remote unit reaches the location indicated by arrow 350, it remains serviced by system $S_1$ at frequency $f_1$, by the base station corresponding to coverage area $C_{1B}$. Likewise the connection of a remote unit that travels from system $S_2$ to system $S_1$ is represented by dashed line 354. Note that until the remote unit reaches the location indicated by arrow 352, it remains serviced by the base station corresponding to coverage area $C_{2B}$. Therefore, between arrow 350 and arrow 352 the service providing communication to the remote unit depends on which system was providing communication when the remote unit entered the region. The remote unit may move around within the region between arrow 352 and 350 without handing off between the two systems.

Referring again to FIG. 4B, another solution to the hard handoff dilemma is to increase the size of hard handoff region 170. One of the reasons that the region is so narrow is due to the effects of fading. Because a remote unit located within hard handoff region 170 can only establish communication with either base station 200 or base station 205, if the signal fades with respect to the active base station but does not fade with respect to the inactive base station, the interference from the inactive base station becomes significant. One method to increase the size of the region and the reliability of the communication within the region is to minimize the amount of fading experienced by the remote unit in this area. Diversity is one approach for mitigating the deleterious effects of fading. Three major types of diversity exist: time diversity, frequency diversity, and space diversity. Time and frequency diversity are inherently present in a spread spectrum CDMA system.

Space diversity, which is also called path diversity, is created by multiple signal paths of a common signal. Path diversity may be advantageously exploited through spread spectrum processing by separately receiving and processing signals arriving with different propagation delays. Examples of path diversity exploitation are illustrated in U.S. Pat. No. 5,101,501, issued Mar. 31, 1992, entitled "SOFT HANDOFF IN A CDMA CELLULAR TELEPHONE SYSTEM", and U.S. Pat. No. 5,109,390, issued Apr. 28, 1992, entitled "DIVERSITY RECEIVER IN A CDMA CELLULAR TELEPHONE SYSTEM", both assigned to the assignee of the present invention.

The existence of a multipath environment can provide path diversity to a wideband CDMA system. If two or more signal paths are created with differential path delay greater than one chip duration, two or more receivers can be employed to separately receive the signals at a single base station or remote unit receiver. (The required one chip path delay differential is a function of the means by which time tracking is accomplished in the receiver.) After the signals are separately received, they can be diversity combined before the decoding process. Thus the total combined energy from the plurality of paths is used in the decoding process thus increasing the energy and the accuracy of the decoding process. Multipath signals typically exhibit independence in fading, i.e., different multipath signals usually do not fade together. Thus if the output of the two receivers can be diversity combined, a significant loss in performance occurs only when both multipath signals fade at the same time.

Referring again to FIG. 4B, assume that base station 200 is the active base station. If there are two distinct signal components from base station 200 that are received by remote unit 155, the two distinct signals fade independently or nearly independently. Therefore the total signal from base station 200 does not experience the deep fades that occur when receiving only one distinct signal. As a result, the likelihood that the signals from base station 205 will dominate the signal from base station 200 to remote unit 155 is less.

Rather than rely on naturally and statistically developed multipath signals, multipath can be artificially introduced. A typical base station has two receiving antennas and one transmitting antenna. Often the transmitting antenna is same as one of the receiving antennas. Such a base station configuration is shown in FIG. 12.

Figure 12:
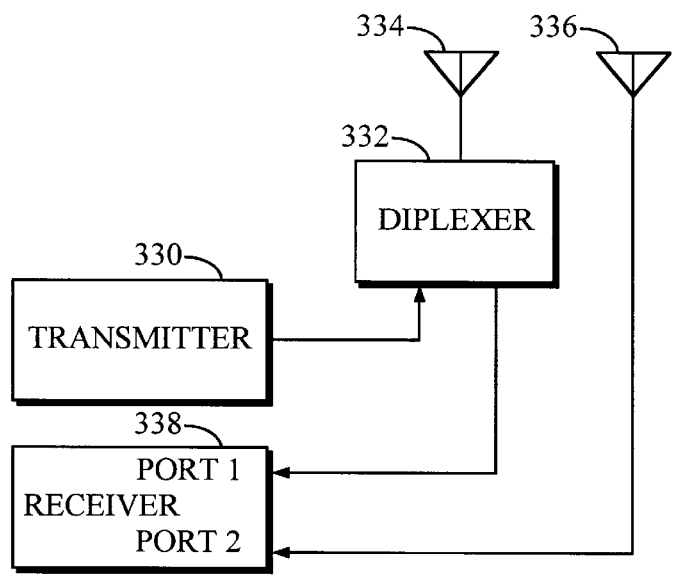
FIG. 12 is a block diagram of a prior art base station comprising receive diversity.

In FIG. 12 transmitter 330 supplies a transmit signal to diplexer 332 which in turn supplies a signal to antenna 334. Antenna 334 supplies a first receive signal to port 1 of receiver 338 and antenna 336 supplies a second receive signal to port 2 of receiver 338. Within receiver 338 the port 1 and port 2 receive signals are separately received and then combined before decoding for maximum advantage. Antenna 334 and antenna 336 are configured at such that the signals received from each antenna fade independently of the signals received from the other. Because the receive signals from antennas 334 and 336 are supplied to different receivers and are not combined until after the signals have been demodulated within receiver 338, it is not critical that the signals received on antenna 334 are offset from the signals received on antenna 336 by at least 1 PN chip direction.

To introduce diversity into the system of FIG. 12, a second diplexer can be used to couple the transmit signal to the formerly receive-only antenna through a delay line. Such a configuration is shown in FIG. 13.

Figure 13:
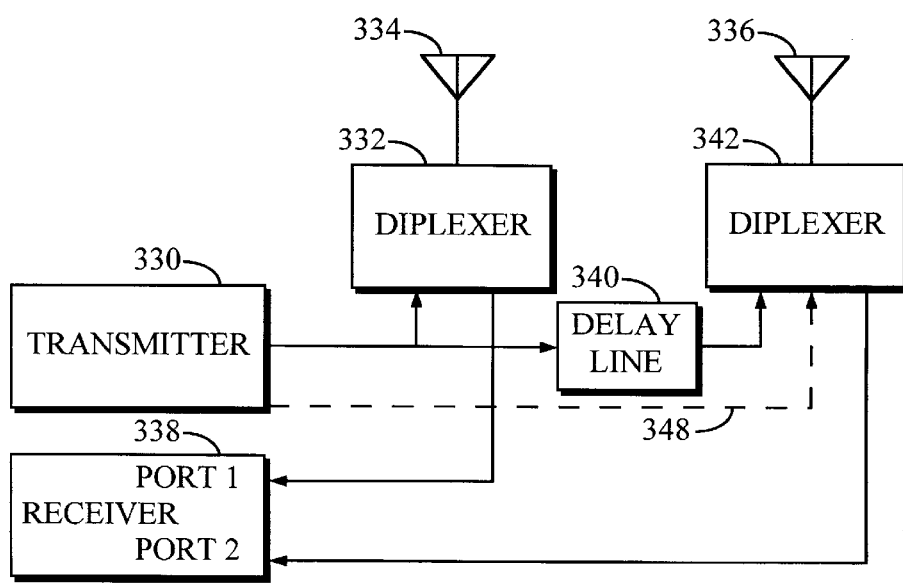
FIG. 13 is a block diagram of a border base station having transmit diversity to produce path diversity.

In FIG. 13 transmitter 330 supplies a transmit signal to diplexer 332 which in turn supplies a signal to antenna 334. In addition, transmitter 330 supplies a transmit signal (which in the most basic embodiment contains the same signals as the original transmit signal) to delay line 340 and to diplexer 342 and to antenna 336. As in FIG. 12, antenna 334 and antenna 336 are configured such that the signals as received from each antenna at the remote unit fade independently. Because both signals are received through a single antenna at the remote unit, in addition to the independence in fading, the two signals must be separated in time sufficiently so that the remote unit can separately distinguish the signals. The delay line adds sufficient delay so that the signal radiated by antenna 336 arrives at the remote unit with a delay greater than one chip relative to the signal from antenna 334 SO that the remote unit can distinguish the signals and separately receive and demodulate them. In the preferred embodiment, the diversity base station configuration of FIG. 13 is only used in the border base stations.

In an alternative embodiment, delay line 340 comprises a gain adjustment element. The gain adjustment element can be used to adjust the level of the signal transmitted by antenna 336 relative to the signal transmitted by antenna 334. The advantage of this configuration is that the signal from antenna 336 does not significantly interfere with other signals in the system. However, the signal level from antenna 336 relative to the signal level from antenna 334 becomes significant when the signal from antenna 334 fades. Thus in the preferred embodiment, if the signal from antenna 334 experience a deep fade with respect to the remote unit, the signal from antenna 336 is sufficiently large to provide reliable communication for the duration of the fade.

It may be advantageous to supply a signal from antenna 336 only when at least one remote unit is located in the hard handoff region. This technique can also be applied to any of the following alternative embodiments.

A yet different embodiment may create a separate signal path carrying a different set of signals for transmission over antenna 336. In this embodiment, the base station determines which remote units need the diversity (i.e. which remote units are located in the hard handoff region.) The set of signals transmitted over antenna 336 may solely comprise the traffic channel signals for the remote units in the hard handoff region and a pilot signal. Alternatively the paging and sync channel transmissions could also be included. As noted directly above, it may be advantageous to supply the pilot and other signals from antenna 336 only when at least one remote unit is located in the hard handoff region. The remote units needing diversity could be identified, for example, by detecting the remote units that require more transmit power than some threshold or based on the round trip delay. The use of two transmitters reduces the net amount of transmitted power and thus will reduce the interference in the system including the interference to remote units within hard handoff region 170 which are in communication with base station 205. In FIG. 13, dashed line 348 illustrates the second embodiment where two separate signal paths carrying a different set of signals are used. It is assumed that any delay between to the two signals that is necessary is induced within transmitter 330.

It should also be noted that the second radiator does not need to be collocated with the base station. It could be separated by a large distance and may be located near the hard handoff boundary. Alternatively, instead of using the formerly receive-only antenna to transmit the diversity signal, the signal could be transmitted from a distinct antenna. The distinct antenna could be a highly directional spot antenna which focuses energy on the hard handoff region.

An especially advantageous configuration may be achieved by using a separate signal path in conjunction with a distinct antenna. In this case, more diversity may be achieved by assigning the signal to be transmitted by the distinct antenna a different PN offset than the PN offset nominally assigned to transmitter 330. In this way, the base station executes a softer handoff when the remote unit enters the coverage area of the distinct antenna. The use of a distinct PN offset is useful in identifying when the remote unit is located in the hard handoff region. The embodiments above can be implemented with a variety of different topologies to provide the same results.

It is also noted that there are several methods by which to introduce diversity into the system. For example, the effects of fading can also be minimized by vacillation of the phase of the signal from the diversity antenna. Vacillation of the phase disrupts the alignment of the amplitude and phase of the multipath signals which can create a deep fade in a channel. An example of such a system is detailed in U.S. Pat. No. 5,437,055, entitled "ANTENNA SYSTEM FOR MULTIPATH DIVERSITY IN AN INDOOR MICROCELLULAR COMMUNICATION SYSTEM" which issued Jul. 25, 1996 and which is assigned to the assignee of the present invention.

The deleterious effects of fading can be further controlled to a certain extent in a CDMA system by controlling transmit power. A fade which decreases the power received by the remote unit from the base station can be compensated for by increasing the power transmitted by the base station. The power control function operates in accordance with a time constant. Depending on the time constant of the power control loop and the length of time of a fade, the system may compensate for the fade by increasing transmit power of the base station. The nominal power level transmitted from the base station to a remote unit could be increased when the remote unit is in the region in which a hard handoff may be performed. Again the remote units in need of increased power could be identified, for example, based on the round trip delay or by report of a pilot signal exceeding a threshold. By only increasing the power transmitted to those remote units in need, the net amount of transmitted power is reduced thus reducing the total interference in the system.

As noted above in conjunction with FIG. 3, one situation in which a hard handoff may need to be performed is a situation in which a remote unit must change the frequency at which it operates within a single system. For example, such a handoff may be made to avoid interference with a point to point microwave links which operates in co-existence with the CDMA communication system or to transition all traffic channel signals to a single frequency so that a CDMA-to-CDMA different frequency handoff can occur at the boundary of the system. In FIG. 3, point to point microwave link 140 is shown between directional microwave antenna 130 and directional microwave antenna 135. Because directional microwave antenna 130 and directional microwave antenna 135 are highly directional, point to point microwave link 140 has a very narrow field. As such, the other base stations of the system such as, base stations 115,120, and sectors 50,70, and 80 may operate without interference with point to point microwave link 140.

In the example of the preferred embodiment, the CDMA signals are being transmitted at microwave frequencies and therefore the point-to-point link which intersects the system only interferes if it also operates at a microwave frequency. The point-to-point link in the most general embodiment may operate at frequencies higher or lower than those generally designated as microwave frequencies.

Figure 11:
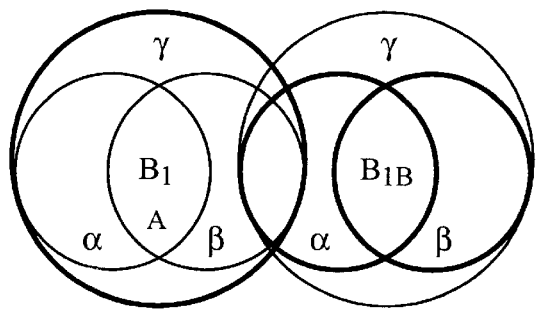
FIG. 11 illustrates an alternative configuration providing a CDMA to CDMA different frequency handoff using a single multi-sectored base station.

Although the techniques previously described herein may be applicable to such a hard handoff, typically the intrasystem hard handoff has an advantage over the intersystem hard handoffs in that the two base stations between which handoff is to be completed are controlled by the same controller. FIG. 11 illustrates an alternative configuration for providing a CDMA to CDMA different frequency handoff using a single multi-sectored base station. Both base station $B_{1A}$ and base station $B_{1B}$ have two directional sectors labeled sectors $\alpha$ and $\beta$. In base station $B_{1A}$, sectors $\alpha$ and $\beta$ operate at frequency $f_1$. In base station $B_{1B}$ sectors $\alpha$ and $\beta$ operate at frequency $f_2$. Both base station $B_{1A}$ and base station $B_{1B}$ have one omnidirectional sector, $\gamma$, operating at a different frequency than the directional sectors in that base station. For example, in base station $B_{1A}$ sector $\gamma$ operates at frequency $f_2$ and in base station $B_{1B}$ sector $\gamma$ operates at frequency $f_1$.

FIG. 11 uses the hand-down rule. The omnidirectional sectors $\gamma$ are marked as boundary sectors with a round trip delay threshold of 0 meaning that if either of the $\gamma$ sectors is the only base station in the Active Set, a handoff is immediately triggered no matter what the round trip delay is. Notice that the $\gamma$ sectors are not actually boundary sectors between two systems but from the remote unit perspective the action taken is the same. As the remote unit travels into base station $B_{1A}$ from an abutting coverage area within system $S_1$ at frequency $f_1$, soft handoff is used to establish communication with sector α of base station $B_{1A}$, and soft or softer handoff to transfer the connection to sector β of base station $B_{1A}$. Soft handoff is then used to transfer the connection to sector γ of base station $B_{1B}$ which is marked as a boundary base station. As soon as sector γ of base station $B_{1B}$ becomes the only member of the Active Set, a hard handoff from sector γ of base station $B_{1B}$ to sector β of base station $B_{1B}$ is made.

Note that this configuration also introduces spatial hysteresis in that once operation has been transferred to frequency $f_2$, operation is not transferred back to frequency $f_1$ unless the remote unit enters the coverage area of sector γ of base station $B_{1A}$ to such an extent that it become the only member of the Active Set. Also note that the choice of using three different sectors rests in the fact that most multi-sectored base stations are comprised of three sectors and therefore available base station equipment typically supports three sectors. As such, a design using three sectors makes practical sense. Of course, a greater or lessor number of sectors could be used.

There are two different types of situations in which such a configuration may be used. The configuration of FIG. 11 can be used at a location where all traffic must change frequencies. In such a case, base stations to the left of base station $B_{1A}$ does not use frequency $f_2$ and base stations to the right of base station $B_{1B}$ does not use frequency $f_1$. In such a case, all remote units entering one side and exiting from the other side must transition frequencies. In an alternative situation, base stations to the right of base station $B_{1B}$ use only frequency $f_2$ such as for example because a microwave link prohibits the use of frequency $f_1$ in that area. However, base stations to the left of base station $B_{1A}$ can operate on either frequency $f_1$ or frequency $f_2$. In such a case, either all, some, or none of the remote units traveling from base station $B_{1B}$ to base station $B_{1A}$ may transition from frequency $f_2$ to frequency $f_1$.

Figure 16:
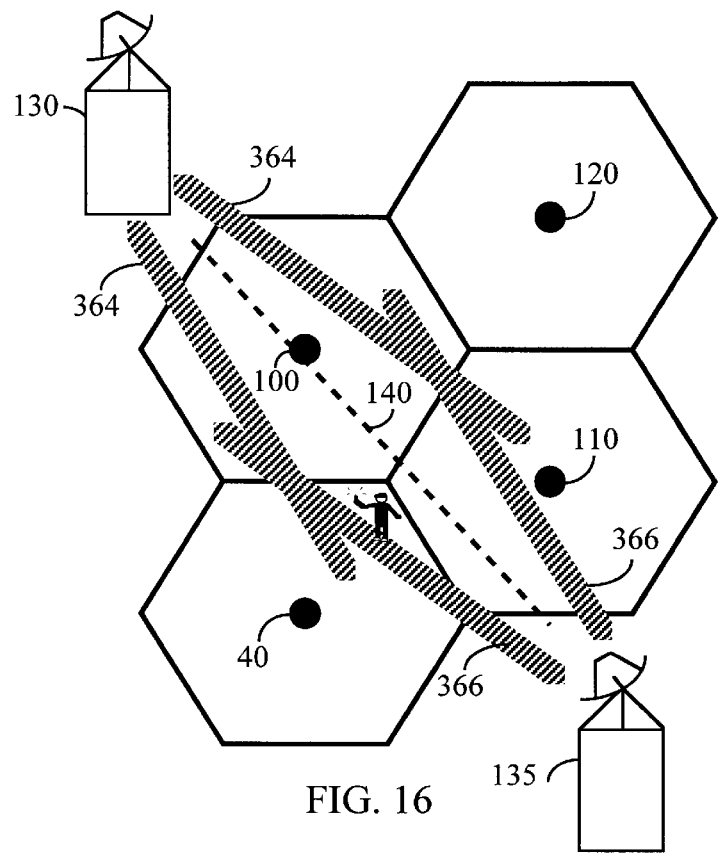
FIG. 16 illustrates the use of a "Cone of Silence" in a CDMA system intersected by a point to point microwave link.

A second very different method of dealing with point to point microwave links or other areas where a piece of spectrum needs to be cleared is illustrated in FIG. 16. In FIG. 16 a "Cone of Silence" is constructed around point to point microwave link 140 as shown by beams 364 and 366. The cone of silence is a pilot signal that acts as a reference signal to the remote units that detect it. When a remote unit reports the detection a pilot signal corresponding to the cone of silence, the system controller knows the pilot signal is a cone of silence indication rather than a viable candidate pilot signal. The system controller uses receipt of the pilot signal corresponding to the cone of silence as a stimulus to initiate a hard handoff. Typically the handoff performed is a intra-system CDMA to CDMA different frequency handoff although other types of handoff may be performed.

Figure 17:
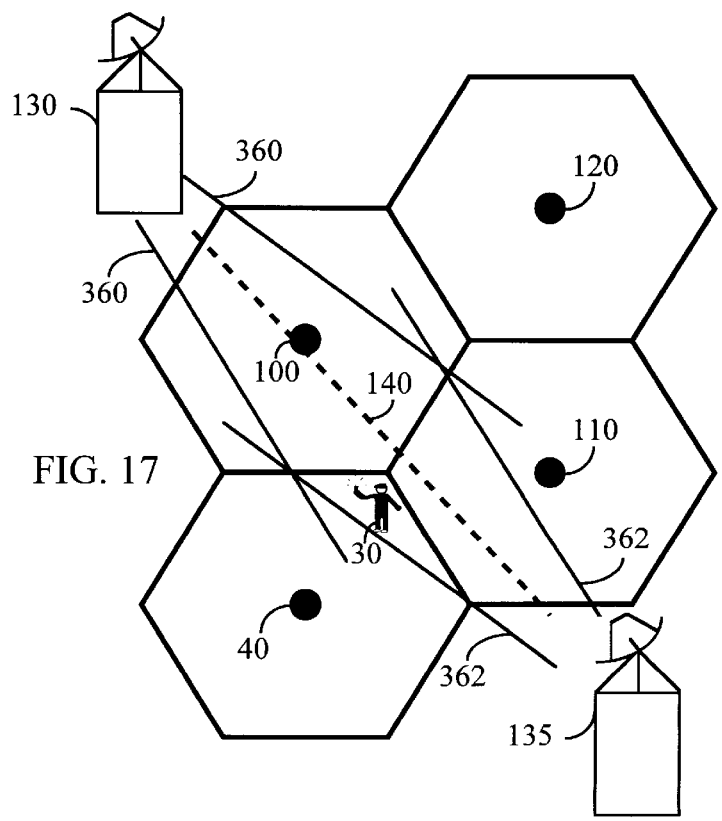
FIG. 17 illustrates the use of a "Cone of Silence" in a CDMA system intersected by a point to point microwave link in which the cone of silence coverage area and the microwave link coverage area are substantially the same.

An interesting aspect of the cone of silence is that the cone of silence pilot signal is unassociated with any base station in particular. Typically the cone of silence pilot signal is generated by a pilot beacon unit collocated with directional microwave antennas 130 and 135. There are two different cone of silence topologies which can be used. In the first topology shown in FIG. 16, beams 364 and 366 are actually narrow transmission bands guarding either side of point to point microwave link 140. In the second topology shown in FIG. 17, beams 360 and 362 define the edges of the pilot signal transmission coverage area. In FIG. 17, the pilot signal coverage area and point to point microwave link 140 coverage area actually overlay the same region. Typically beams 364 and 366 are produced by two separate antennas distinct from the microwave antenna. Beams 360 and 362 may be created by the same antenna as the microwave signal, a different but identical antenna or an antenna defining a slightly broader coverage area than said microwave antenna.

The first topology in FIG. 16 has the advantage that the cone of silence pilot signals do not interfere with the point to point microwave link even if the point to point microwave link operates at the same frequency as the cone of silence pilot signal. The first topology has the disadvantage that if the remote unit passes through the cone of silence pilot signal beams without detecting the signals and without changing frequency, the connection may be dropped or the connection may continue and produce interference for the point to point microwave link. Also if power is applied to the remote unit while it is located within beams 364 and 366 the remote unit will be unable to detect the pilot signals and may cause interference to the microwave link.

The microwave link may be bidirectional and as such operation of the link may require two CDMA frequency channels. In one embodiment, two CDMA reverse link channels are cleared to accommodate the point to point microwave link. Two different forward link cone of silence pilot signals are transmitted in the cone of silence coverage area corresponding to each of the two reverse link channels cleared for the point to point microwave link. In this way the two pilot signals can overlay the point to point microwave link coverage area without interfering with the actual communication between the two directional antennas due to the frequency diversity.

In yet a third embodiment, the pilot signal may be able to co-exist at the same frequency with the point to point microwave link without causing a significant amount of interference to the point to point microwave link. The CDMA pilot signal is a broad band, low power, spread spectrum signal. This type of signal is perceived as simple Gaussian noise to other types of communication systems. The inherent CDMA signal properties make it uniquely able to co-exist with other communication systems without inducing significant interference.

The distance between two point to point microwave link antennas can be much greater than the distance between a typical base station and the edge of the coverage area which it defines. Therefore the delay at which the remote unit perceives the cone of silence pilot signal can be significantly longer than the delay typically associated with a cellular system. As such, it may be necessary that the cone of silence pilot signal be recognized as one of a set of consecutive pilot signal offsets. For example the delay induced in the cone of silence pilot signal is greater than the normal offset between pilot signals causing the perceived pilot signal offset to be mapped to the next consecutive pilot signal offset. This type of operation is typically not a problem because a typical system uses only every seventh or eighth PN offset. The set of offsets at which the cone of silence pilot signals are expected may be added to the neighbor set so that the remote unit searches for these signals in the same manner that it searches for the other neighbor list entries.

Upon detection of the cone of silence pilot signal the action taken depends on the base stations with which active communication is established. Because the same cone of silence pilot signal may traverse many base station coverage areas, the pilot signal itself provides very little information as to the location of the remote unit or the action that needs to be taken. The base station and frequency to which handoff should be made is based on the members of the Active Set at the time the pilot signal is perceived. Also the action to be taken could be determined by the members of the Active and Candidate sets. Additionally, the action to be taken could be based on the perceived PN offset of the cone of silence pilot signal. Also, it may be advantageous to postpone the action to be taken until the signal strength of the cone of silence pilot signal exceeds a second higher threshold. Because the cone of silence pilot signal is providing so little information, the same pilot signal offset may be used throughout the system to protect a plurality of different point to point microwave links. In FIG. 16, all of beams 364 and 366 may operate at the same or at four different PN offsets.

If the distance between the two point to point microwave link antennas becomes to long. It may be necessary to use a repeater to extend the coverage of the pilot signal. A method and apparatus for providing a repeater in a CDMA system is detailed in co-pending U.S. patent application Ser. No. 08/522,469 entitled "Same Frequency, Time-Division-Duplex Repeater" filed Aug. 31, 1995 and assigned to the assignee of the present invention.

Alternatively, a series of antennas providing the same or different offset pilot sequences can be installed along the path of the microwave length to more narrowly and precisely and reliable define the cone of silence area.

Many of the concepts of the present invention can be combined. For example the detection and hand-down rules can be used in conjunction with physical coverage area configurations which provide both intrasystem and intersystem spatial hystersis. The rules can also be combined with other network planning configurations to provide maximum benefit such as the use of CDMA to CDMA different frequency handoff. The parameters which control the soft handoff process may be augmented to increase the number of members of the Candidate and Active Sets. Base station breathing may also augmented. The remote unit measurement directed hard handoff concept can be combined with physical coverage area configurations which provide both intrasystem and intersystem spatial hystersis. It can also be combined with other network planning configurations to provide maximum benefit such as the use of CDMA to CDMA different frequency handoff.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. In a communications network in which a remote unit communicates with another user via at least one base station, said network including a plurality of base stations controlled by a mobile switching center, a method for defining an area in which communication between a set of said base stations and said remote unit is forbidden at a given frequency comprising the steps of:

transmitting from each base station of said plurality of base stations an identifying pilot signal;

transmitting a silent region identifying pilot signal from an auxiliary antenna collocated with a point to point antenna used to transmit a point to point signal, the auxiliary antenna providing a guard band coverage area which does not greatly overlay a coverage area created by said point to point antenna;

providing a second auxiliary antenna collocated with said point to point antenna, wherein said second auxiliary antenna provides a second guard band coverage area which does not greatly overlay said coverage area created by said point to point antenna and wherein said guard band coverage area and said second guard band coverage area are located on opposite sides of said coverage area created by said point to point antenna;

measuring a signal strength of a set of identifying pilot signals corresponding to a neighbor set of base stations at said remote unit;

measuring a signal strength of said silent region identifying pilot signal at said remote unit;

reporting a pilot strength measurement report by said remote unit to said mobile switching center via a first base station with which said remote unit has established communication, wherein said pilot strength measurement report comprises a list of measured pilot offsets having a signal strength which exceeds a predetermined threshold; and initiating a handoff of said established communication between said remote unit and said first base station if said pilot strength measurement report comprises an entry corresponding to said silent region identifying pilot signal.

2. In a communications network in which a remote unit communicates with another user via at least one base station, said network including a plurality of base stations controlled by a mobile switching center, a method for defining an area in which communication between a set of said base stations and said remote unit is forbidden at a given frequency comprising the steps of:

transmitting from each base station of said plurality of base stations an identifying pilot signal;

transmitting a silent region identifying pilot signal from an auxiliary antenna collocated with a point to point transmitter;

transmitting from a second auxiliary antenna a second silent region identifying pilot signal wherein said second auxiliary antenna is collocated with a point to point receiver for receiving a point to point signal transmitted by said point to point transmitter;

measuring a signal strength of a set of identifying pilot signals corresponding to a neighbor set of base stations at said remote unit;

measuring a signal strength of said silent region identifying pilot signal at said remote unit;

reporting a pilot strength measurement report by said remote unit to said mobile switching center via a first base station with which said remote unit has established communication, wherein said pilot strength measurement report comprises a list of measured pilot offsets having a signal strength which exceeds a predetermined threshold; and initiating a handoff of said established communication between said remote unit and said first base station if said pilot strength measurement report comprises an entry corresponding to said silent region identifying pilot signal;

wherein each of said plurality of base stations transmits a common pilot sequence spread by a pseudorandom noise (PN) sequence and wherein each of said plurality of base stations transmits said common pilot sequence at an identifying channel offset designated in PN chips so as to provide said identifying pilot signal.

3. The method of claim 2 wherein said identifying channel offsets are all multiples of a system wide pilot sequence offset index increment and wherein said silent region identifying pilot signal is associated with a consecutive series of said identifying channel offsets.

4. The method of claim 2 wherein said silent region identifying pilot signal is generated at a first identifying channel offset and wherein said second silent region identifying pilot signal is generated at said first identifying channel offset.

5. The method of claim 2 wherein said silent region identifying pilot signal is generated at a first identifying channel offset and wherein said second silent region identifying pilot signal is generated at a second identifying channel offset.

6. The method of claim 5 wherein said silent region identifying pilot signal is generated by a pilot beacon unit.

7. In a communications network in which a remote unit communicates with another user via at least one base station, said network including a plurality of base stations controlled by a mobile switching center, a method for defining an area in which communication between a set of said base stations and said remote unit is forbidden at a given frequency comprising the steps of:

transmitting from each base station of said plurality of base stations an identifying pilot signal;

transmitting a silent region identifying pilot signal from an auxiliary antenna collocated with a point to point transmitter;

transmitting from a second auxiliary antenna a second silent region identifying pilot signal wherein said second auxiliary antenna is collocated with a point to point receiver for receiving a point to point signal transmitted by said point to point transmitter;

measuring a signal strength of a set of identifying pilot signals corresponding to a neighbor set of base stations at said remote unit;

measuring a signal strength of said silent region identifying pilot signal at said remote unit;

reporting a pilot strength measurement report by said remote unit to said mobile switching center via a first base station with which said remote unit has established communication, wherein said pilot strength measurement report comprises a list of measured pilot offsets having a signal strength which exceeds a predetermined threshold; and initiating a handoff of said established communication between said remote unit and said first base station if said pilot strength measurement report comprises an entry corresponding to said silent region identifying pilot signal;

wherein said antenna system is a set of antennas comprising a point to point antenna used to transmit said point to point signal over a first coverage area and a pilot signal antenna used to transmit said region identifying pilot signal over a first guard band coverage area which is offset from said coveragge area created by said point to point antenna and wherein said auxiliary antenna is collocated with a point to point transmitter further comprising the step of transmitting from a second auxiliary antenna a second silent region identifying pilot signal wherein said second auxiliary antenna is collocated with a second point to point transmitter.

8. The method of claim 7 transmitting from each of said plurality of base stations a common pilot sequence spread by a pseudorandom noise (PN) sequence and wherein each of said plurality of base stations transmits said common pilot sequence at an identifying channel offset designated in PN chips so as to provide said identifying pilot signal.

9. The method of claim 8 wherein said identifying channel offsets are all multiples of a system wide pilot sequence offset index increment and wherein said silent region identifying pilot signal is associated with a consecutive series of said identifying channel offsets.

10. The method of claim 9 wherein said silent region identifying pilot signal is generated at a first identifying channel offset and wherein said second silent region identifying pilot signal is generated at said first identifying channel offset.

11. The method of claim 7 wherein said silent region identifying pilot signal is generated at a first identifying channel offset and wherein said second silent region identifying pilot signal is generated at a second identifying channel offset.

12. The method of claim 11 wherein said second silent region identifying pilot signal is generated by a pilot beacon unit.

13. An apparatus for designating an area of a communications system wherein said communications system is used by at least one remote unit to communicate with another user, said communications system comprising a plurality of base stations each transmitting an identifying pilot signal, wherein a remote unit measures a signal strength of a set of identifying pilot signals corresponding to a neighbor set of base stations and reports a pilot strength with which communication is established, said apparatus comprising;

a pilot beacon unit for generating a region identifying pilot signal; and an antenna system for transmitting said region identifying pilot signal and a point to point signal wherein said point to point signal is not a signal used by said communications system to communicate with said at least one remote unit wherein said antenna system comprises a second pilot signal antenna used to transmit a second region identifying pilot created by said point to point antenna and wherein said first guard band coverage area and said second guard band coverage area are located on opposite sides of said coverage area created by said point to point antenna.

14. The apparatus of claim 13 wherein each of said plurality of base stations transmits a common pilot sequence spread by a pseudorandom noise (PN) sequence and wherein each of said plurality of base stations transmits said common pilot sequence at an identifying channel offset designated in PN chips so as to provide said identifying pilot signal.

15. The apparatus of claim 14 wherein said identifying channel offsets are all multiples of a system wide pilot sequence offset index increment and wherein said region identifying pilot signal is associated with a consecutive series of said identifying channel offsets.

16. The apparatus of claim 14 wherein said region identifying pilot signal is generated at a first identifying channel offset and wherein said second region identifying pilot signal is generated at said first identifying channel offset.

17. The apparatus of claim 14 wherein said region identifying pilot signal is generated at a first identifying channel offset and wherein said second region identifying pilot signal is generated at a second identifying channel offset.

18. An apparatus for designating an area of a communications system wherein said communications system is used by at least one remote unit to communicate with another user, said communications system comprising a plurality of base stations each transmitting an identifying pilot signal, wherein a remote unit measures a signal strength of a set of identifying pilot signals corresponding to a neighbor set of base stations and reports a pilot strength measurement message to a mobile switching center via a first base station with which communication is established, said apparatus comprising:

- a pilot beacon unit for generating a region identifying pilot signal; and
- a first antenna system for transmitting said region identifying pilot signal and a point to point signal wherein said point to point signal is not a signal used by said communications system to communicate with said at least one remote unit;
- a second antenna system for transmitting a second region identifying pilot signal and receiving said point to point signal transmitted by said first antenna system;
- wherein said identifying channel offsets are all multiples of a system wide pilot sequence offset index increment and wherein said region identifying pilot signal is associated with a consecutive series of said identifying channel offsets.

19. An apparatus for designating an area of a communications system wherein said communications system is used by at least one remote unit to communicate with another user, said communications system comprising a plurality of base stations each transmitting an identifying pilot signal, wherein a remote unit measures a signal strength of a set of identifying pilot signals corresponding to a neighbor set of base stations and reports a pilot strength measurement message to a mobile switching center via a first base station with which communication is established, said apparatus comprising:

- a pilot beacon unit for generating a region identifying pilot signal; and
- a first antenna system for transmitting said region identifying pilot signal and a point to point signal wherein said point to point signal is not a signal used by said communications system to communicate with said at least one remote unit;
- a second antenna system for transmitting a second region identifying pilot signal and receiving said point to point signal transmitted by said first antenna system;
- wherein said region identifying pilot signal is generated at a first identifying channel offset and wherein said second region identifying pilot signal is generated at said first identifying channel offset.

20. An apparatus for designating an area of a communications system wherein said communications system is used by at least one remote unit to communicate with another user, said communications system comprising a plurality of base stations each transmitting an identifying pilot signal, wherein a remote unit measures a signal strength of a set of identifying pilot signals corresponding to a neighbor set of base stations and reports a pilot strength measurement message to a mobile switching center via a first base station with which communication is established, said apparatus comprising:

- a pilot beacon unit for generating a region identifying pilot signal; and
- a first antenna system for transmitting said region identifying pilot signal and a point to point signal wherein said point to point signal is not a signal used by said communications system to communicate with said at least one remote unit;
- a second antenna system for transmitting a second region identifying pilot signal and receiving said point to point signal transmitted by said first antenna system;
- wherein said region identifying pilot signal is generated at a first identifying channel offset and wherein said second region identifying pilot signal is generated at said second identifying channel offset.

21. An apparatus for designating an area of a communications system wherein said communications system is used by at least one remote unit to communicate with another user, said communications system comprising a plurality of base stations each transmitting an identifying pilot signal, wherein a remote unit measures a signal strength of a set of identifying pilot signals corresponding to a neighbor set of base stations and reports a pilot strength measurement message to a mobile switching center via a first base station with which communication is established, said apparatus comprising:

- a pilot beacon unit for generating a region identifying pilot signal; and
- a first antenna system for transmitting said region identifying pilot signal and a point to point signal wherein said point to point signal is not a signal used by said communications system to communicate with said at least one remote unit;
- a second antenna system for transmitting a second region identifying pilot signal and receiving said point to point signal transmitted by said first antenna system;
- wherein said region identifying pilot signal is generated by a pilot beacon unit.

22. An apparatus for designating an area of a communications system wherein said communications system is used by at least one remote unit to communicate with another user, said communications system comprising a plurality of base stations each transmitting an identifying pilot signal, wherein a remote unit measures a signal strength of a set of identifying pilot signals corresponding to a neighbor set of base stations and reports a pilot strength measurement message to a mobile switching center via a first base station with which communication is established, said apparatus comprising:

- a pilot beacon unit for generating a region identifying pilot signal; and
- a first antenna system for transmitting said region identifying pilot signal and a point to point signal wherein said point to point signal is not a signal used by said communications system to communicate with said at least one remote unit;
- an intermediate repeater receiving said region identifying pilot signal and retransmitting said region identifying silent region pilot signal from said intermediate repeater.

23. The apparatus of claim 22 wherein said repeater is a time division duplex repeater.

* * * * *